(12) United States Patent
Rohatgi et al.

(10) Patent No.: US 9,994,659 B2
(45) Date of Patent: *Jun. 12, 2018

(54) POLYMERS WITH IMPROVED PROCESSABILITY FOR PIPE APPLICATIONS

(71) Applicant: Chevron Phillips Chemical Company LP, The Woodlands, TX (US)

(72) Inventors: Vivek Rohatgi, Owasso, OK (US); Yongwoo Inn, Bartlesville, OK (US); Ashish M. Sukhadia, Bartlesville, OK (US); Qing Yang, Bartlesville, OK (US); Paul J. DesLauriers, Owasso, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/792,271

(22) Filed: Oct. 24, 2017

(65) Prior Publication Data

US 2018/0044454 A1 Feb. 15, 2018

Related U.S. Application Data

(63) Continuation of application No. 14/522,991, filed on Oct. 24, 2014, now Pat. No. 9,828,451.

(51) Int. Cl.
| | |
|---|---|
| *C08F 210/16* | (2006.01) |
| *C08L 23/08* | (2006.01) |
| *C08F 4/65* | (2006.01) |
| *C08F 4/6592* | (2006.01) |
| *C08F 4/659* | (2006.01) |

(52) U.S. Cl.
CPC ........ *C08F 210/16* (2013.01); *C08L 23/0815* (2013.01); *C08F 4/65912* (2013.01); *C08F 4/65916* (2013.01); *C08F 4/65925* (2013.01); *C08F 4/65927* (2013.01); *C08L 2203/18* (2013.01); *C08L 2205/025* (2013.01); *C08L 2312/00* (2013.01)

(58) Field of Classification Search
CPC ............... C08F 210/16; C08F 4/65927; C08F 4/65912; C08F 4/65916; C08F 4/65925; C08L 23/0815; C08L 2203/18; C08L 2205/025; C08L 2312/00
USPC ....................................................... 428/36.9
See application file for complete search history.

(56) References Cited

U.S. PATENT DOCUMENTS

| | | | |
|---|---|---|---|
| 3,248,179 A | 4/1966 | Norwood | |
| 4,060,480 A | 11/1977 | Reed et al. | |
| 4,452,910 A | 6/1984 | Hopkins et al. | |
| 4,501,885 A | 2/1985 | Sherk et al. | |
| 4,588,790 A | 5/1986 | Jenkins, III et al. | |
| 4,939,217 A | 7/1990 | Sticklen | |
| 5,191,132 A | 3/1993 | Patsidis et al. | |
| 5,210,352 A | 5/1993 | Alt et al. | |
| 5,347,026 A | 9/1994 | Patsidis et al. | |
| 5,352,749 A | 10/1994 | DeChellis et al. | |
| 5,376,611 A | 12/1994 | Shveima | |
| 5,399,636 A | 3/1995 | Alt et al. | |
| 5,401,817 A | 3/1995 | Palackal et al. | |
| 5,420,320 A | 5/1995 | Zenk et al. | |
| 5,436,304 A | 7/1995 | Griffin et al. | |
| 5,436,305 A | 7/1995 | Alt et al. | |
| 5,451,649 A | 9/1995 | Zenk et al. | |
| 5,455,314 A | 10/1995 | Burns et al. | |
| 5,496,781 A | 3/1996 | Geerts et al. | |
| 5,498,581 A | 3/1996 | Welch et al. | |
| 5,541,272 A | 7/1996 | Schmid et al. | |
| 5,554,795 A | 9/1996 | Frey et al. | |
| 5,563,284 A | 10/1996 | Frey et al. | |
| 5,565,175 A | 10/1996 | Hottovy et al. | |
| 5,565,592 A | 10/1996 | Patsidis et al. | |
| 5,571,880 A | 11/1996 | Alt et al. | |
| 5,575,979 A | 11/1996 | Hanson | |
| 5,594,078 A | 1/1997 | Welch et al. | |
| 5,631,203 A | 5/1997 | Welch et al. | |
| 5,631,335 A | 5/1997 | Alt et al. | |
| 5,654,454 A | 8/1997 | Peifer et al. | |

(Continued)

FOREIGN PATENT DOCUMENTS

| | | | | |
|---|---|---|---|---|
| WO | 2005095838 A1 | 10/2005 | | |
| WO | WO 2005095838 A1 * | 10/2005 | ................ | F16L 9/12 |

(Continued)

OTHER PUBLICATIONS

Alt, Helmut G., et al., "C1-Bridged fluorenylidene cyclopentadienylidene complexes of the type (C13H8-CR1R2-C5H3R)ZrCl2 (R1, R2=alkyl, phenyl, alkenyl; R=H, alkyl, alkenyl, substituted silyl) as catalyst precursors for the polymerization of ethylene and propylene," Journal of Organometallic Chemistry, 1998, pp. 87-112, vol. 568, Elsevier Science S.A.

Alt, Helmut G., et al., "C1-verbrückte Fluorenyliden—Indenylidenkomplexe des Typs (C13H8-CR2-C9H6_nR'n) ZrCl2 (n=0, 1; R=Me, Ph, Butenyl; R'=Alkyl, Alkenyl) als Metallocenkatalysatorvorstufen für die Ethylenpolymerisation," Journal of Organometallic Chemistry, 1998, pp. 153-181, vol. 562, Elsevier Science S.A.

(Continued)

*Primary Examiner* — Michael M Bernshteyn
(74) *Attorney, Agent, or Firm* — Conley Rose, P.C.; Rodney B. Carroll; Chad E. Walter

(57) ABSTRACT

A crosslinked metallocene-catalyzed polyethylene copolymer having a higher molecular weight (HMW) component and lower molecular weight (LMW) component wherein the HMW component is present in an amount of from about 10 wt. % to about 30 wt. % and wherein the LMW component is present in an amount of from about 70 wt. % to about 90 wt. %.

22 Claims, 1 Drawing Sheet

(56) References Cited

U.S. PATENT DOCUMENTS

| | | | |
|---|---|---|---|
| 5,668,230 | A | 9/1997 | Schertl et al. |
| 5,705,478 | A | 1/1998 | Boime |
| 5,705,579 | A | 1/1998 | Hawley et al. |
| 6,107,230 | A | 8/2000 | McDaniel et al. |
| 6,165,929 | A | 12/2000 | McDaniel et al. |
| 6,187,880 | B1 | 2/2001 | Welch et al. |
| 6,239,235 | B1 | 5/2001 | Hottovy et al. |
| 6,262,191 | B1 | 7/2001 | Hottovy et al. |
| 6,294,494 | B1 | 9/2001 | McDaniel et al. |
| 6,300,271 | B1 | 10/2001 | McDaniel et al. |
| 6,316,553 | B1 | 11/2001 | McDaniel et al. |
| 6,355,594 | B1 | 3/2002 | McDaniel et al. |
| 6,376,415 | B1 | 4/2002 | McDaniel et al. |
| 6,388,017 | B1 | 5/2002 | McDaniel et al. |
| 6,391,816 | B1 | 5/2002 | McDaniel et al. |
| 6,395,666 | B1 | 5/2002 | McDaniel et al. |
| 6,509,427 | B1 | 1/2003 | Welch et al. |
| 6,524,987 | B1 | 2/2003 | Collins et al. |
| 6,548,441 | B1 | 4/2003 | McDaniel et al. |
| 6,548,442 | B1 | 4/2003 | McDaniel et al. |
| 6,576,583 | B1 | 6/2003 | McDaniel et al. |
| 6,613,712 | B1 | 9/2003 | McDaniel et al. |
| 6,632,894 | B1 | 10/2003 | McDaniel et al. |
| 6,667,274 | B1 | 12/2003 | Hawley et al. |
| 6,750,302 | B1 | 6/2004 | McDaniel et al. |
| 6,833,415 | B2 | 12/2004 | Kendrick et al. |
| 7,026,494 | B1 | 4/2006 | Yang et al. |
| 7,884,163 | B2 | 2/2011 | McDaniel et al. |
| 8,202,940 | B2 * | 6/2012 | Jaker .................. B29B 7/421 525/191 |
| 8,815,357 | B1 * | 8/2014 | Inn .................. C08F 4/65927 428/35.7 |
| 9,828,451 | B2 | 11/2017 | Rohatgi et al. |
| 2007/0007680 | A1 | 1/2007 | Henri Barre et al. |
| 2007/0232716 | A1 | 10/2007 | Guenther et al. |
| 2007/0298508 | A1 | 12/2007 | DesLauriers et al. |
| 2008/0161526 | A1 | 7/2008 | Guenther et al. |
| 2008/0226858 | A1 | 9/2008 | Walter et al. |
| 2010/0133714 | A1 * | 6/2010 | Jaker .................. B29B 7/421 264/83 |
| 2010/0190926 | A1 | 7/2010 | Krishnaswamy et al. |
| 2011/0174413 | A1 | 7/2011 | Ashbaugh et al. |
| 2012/0059134 | A1 | 3/2012 | Yang et al. |

FOREIGN PATENT DOCUMENTS

| | | | | |
|---|---|---|---|---|
| WO | | 2010049167 A1 | 5/2010 | |
| WO | WO | 2010049167 A1 * | 5/2010 | ............... C08F 8/00 |
| WO | | 2013101767 A2 | 7/2013 | |
| WO | | 2014134015 A1 | 9/2014 | |
| WO | WO | 2014134015 A1 * | 9/2014 | ............ C08F 210/16 |

OTHER PUBLICATIONS

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

Cardin, D. J., et al., "Chemistry of Organo-Zirconium and -Hafnium Compounds," Chapter 7, 1986, pp. 145-160 plus 5 pages of cover, publishing information, and contents, Halstead Press: a division of John Wiley & Sons, New York.

Cotton, F. Albert, et al., "Advanced Inorganic Chemistry," Sixth Edition, cover page, title page, pp. ix-x, and 1 page book description, Mar. 30, 1999, John Wiley & Sons, Inc.

Hawley's Condensed Chemical Dictionary, Eleventh Edition, 1987, cover page, contents page, and pp. 862-863, Van Nostrand Reinhold Company, New York.

Hieber, C. A., et al., "Shear-Rate-Dependence Modeling of Polymer Melt Viscosity," Jul. 1992, pp. 931-938, vol. 32, No. 14, Polymer Engineering and Science.

Hieber, C. A., et al., "Some correlations involving the shear viscosity of polystyrene melts," 1989, pp. 321-332, vol. 28, No. 4, Rheologica Acta.

Hubert, L., et al., "Physical and mechanical properties of polyethylene for pipes in relation to molecular architecture. II. Short-term creep of isotropic and drawn materials," Journal of Applied Polymer Science, 2002, pp. 2308-2317, vol. 84, Wiley Periodicals, Inc.

Kajigaeshi, Shoji, et al., "Selective Preparation of Fluorene Derivatives Using the t-Butyl Function as a Positional Protective Group," Bull. Chem. Soc. Jpn., Jan. 1986, pp. 97-103, vol. 59, No. 1, The Chemical Society of Japan.

Köppl, Alexander, et al., "Heterogeneous metallocene catalysts for ethlene polymerization," Journal of Molecular Catalysis A: Chemical, 2001, pp. 23-32, vol. 165, Elsevier Science B.V.

Laurent, E., "Comprehensive evaluation of the long-term mechanical properties of PE100 resins meeting the requirements of modern installation techniques," Oct. 2001, pp. 63-73 plus cover page, Woodhead Publishing Limited.

Pinnavaia, Thomas J., "Intercalated Clay Catalysts," Apr. 22, 1983, pp. 365-371, vol. 220, No. 4595, Science.

Thomas, J. M., "Sheet Silicate Intercalates: New Agents for Unusual Chemical Conversions," Intercalation Chemistry, 1982, Chapter 3, pp. 55-99, Academic Press, Inc.

Wailes, P. C., et al., "Organometallic Chemistry of Titanium, Zirconium, and Hafnium," 1974, pp. 89, 91, 92, 150, 151, 155 plus 6 pages of cover, publishing information, and contents, Academic Press, Inc., New York.

Foreign communication from a related counterpart application—International Search Report and Written Opinion, PCT/US2015/056630, dated Dec. 23, 2015, 12 pages.

Foreign communication from a related counterpart application—International Preliminary Report on Patentability, PCT/US2015/056630, dated Apr. 25, 2017, 9 pages.

* cited by examiner

Sample #2

Sample #3

POLYMERS WITH IMPROVED PROCESSABILITY FOR PIPE APPLICATIONS

CROSS-REFERENCE TO RELATED APPLICATIONS

This application is a continuation of and claims priority to U.S. patent application Ser. No. 14/522,991 filed Oct. 24, 2014, published as U.S. Patent Application Publication US 2016/0115264 A1 and entitled "Polymers with Improved Processability for Pipe Applications," now U.S. Pat. No. 9,828,451, which is incorporated by reference herein in its entirety.

FIELD

The present disclosure relates to polymer compositions, more specifically polyethylene compositions, and articles (e.g., pipe) made from same.

BACKGROUND

Polyolefins are plastic materials useful for making a wide variety of valued products due to their combination of features such as stiffness, ductility, barrier properties, temperature resistance, optical properties, availability, and low cost. In particular, polyethylene (PE) is the one of the largest volume polymers consumed in the world. It is a versatile polymer that offers high performance relative to other polymers and alternative materials such as glass or metal. One of the most valued polyolefin products is plastic pipes. Thus, an ongoing need exists for improved polymer compositions displaying desired processing characteristics for producing articles such as pipes.

SUMMARY

Disclosed herein is a crosslinked metallocene-catalyzed polyethylene copolymer having a higher molecular weight (HMW) component and lower molecular weight (LMW) component wherein the HMW component is present in an amount of from about 10 wt. % to about 30 wt. % and wherein the LMW component is present in an amount of from about 70 wt. % to about 90 wt. %.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1A:
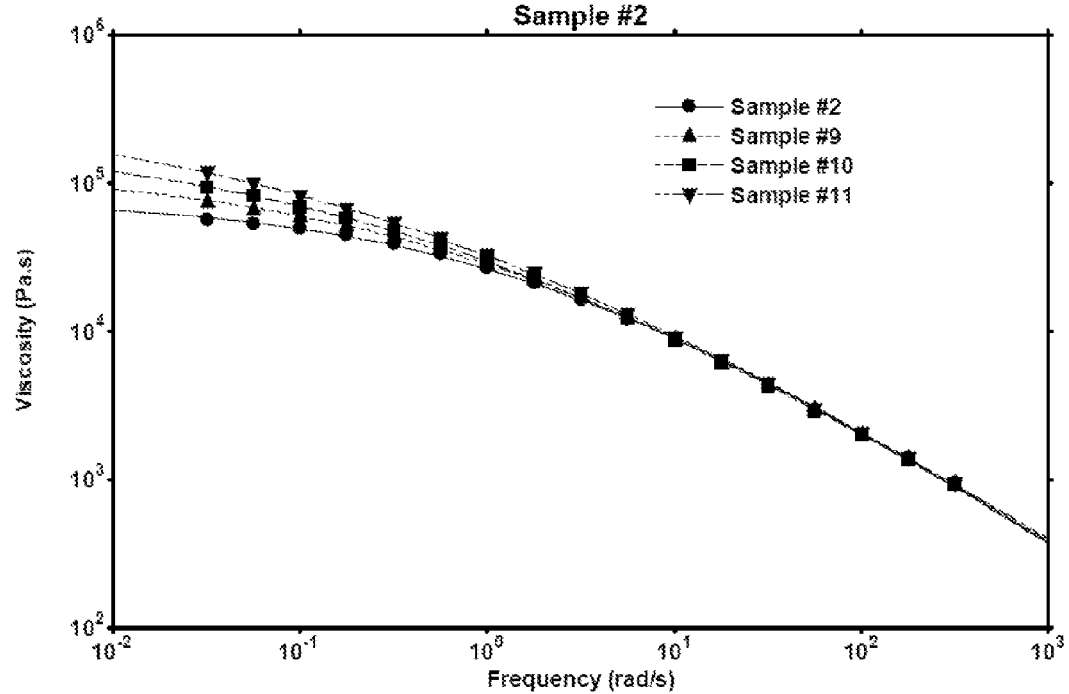
FIG. 1A displays viscosity curves for sample #2 from Example 1 with various amounts of peroxide modifier.

Disclosed herein are polyethylene (PE) copolymers, PE copolymer pipes, and methods of making same. Such methods can comprise preparing a PE copolymer and forming the PE copolymer into a pipe. For purposes of the disclosure herein, the terms "polymer" and "copolymer" can be used interchangeably. As used herein, the term "polymer" or "copolymer" refers both to a material collected as the product of a polymerization reaction (e.g., a reactor or virgin resin) and a polymeric composition comprising a polymer and one or more additives. In an embodiment, a monomer (e.g., ethylene) and a comonomer (e.g., 1-hexene) can be polymerized using the methodologies disclosed herein to produce a copolymer of the type disclosed herein. In an embodiment, PE copolymers of the type disclosed herein can be characterized as bimodal metallocene copolymers having improved processability.

In an embodiment, the PE copolymers of the type described herein can be prepared by any suitable methodology, for example by employing one or more catalyst systems, in one or more reactors, in solution, in slurry, or in the gas phase, and/or by varying the monomer and/or comonomer concentration in the polymerization reaction, and/or by changing any/all of the materials or parameters involved in the production of the PE copolymers, as will be described in more detail later herein.

The PE copolymers of the present disclosure can be formed using any suitable olefin polymerization method which can be carried out using various types of polymerization reactors. As used herein, "polymerization reactor" includes any polymerization reactor capable of polymerizing olefin monomers and comonomers to produce copolymers. Such copolymers produced in the reactor can be referred to as resins and/or copolymers.

The various types of reactors include those that can be referred to as batch, slurry, gas-phase, solution, high pressure, tubular, or autoclave reactors. Gas phase reactors can comprise fluidized bed reactors or staged horizontal reactors. Slurry reactors can comprise vertical and/or horizontal loops. High pressure reactors can comprise autoclave and/or tubular reactors. Reactor types can include batch and/or continuous processes. Continuous processes could use intermittent and/or continuous product discharge or transfer. Processes can also include partial or full direct recycle of un-reacted monomer, un-reacted comonomer, catalyst, co-catalyst and/or diluent.

Polymerization reactor systems of the present disclosure can comprise one type of reactor in a system or multiple reactors of the same or different type, operated in any suitable configuration. Production of polymers in multiple reactors can include several stages in at least two separate polymerization reactors interconnected by a transfer device making it possible to transfer the polymers resulting from a first polymerization reactor into a second reactor. The desired polymerization conditions in one of the reactors can be different from the operating conditions of the other reactors. Alternatively, polymerization in multiple reactors can include the manual or automatic transfer of polymer from one reactor to subsequent reactors for continued polymerization. Multiple reactor systems can include any combination including, but not limited to, multiple loop reactors, multiple gas reactors, a combination of loop and gas reactors, multiple high pressure reactors, or a combination of high pressure with loop and/or gas reactors. The multiple reactors can be operated in series or in parallel.

According to one aspect of the disclosure, the polymerization reactor system can comprise at least one loop slurry reactor comprising vertical and/or horizontal loops. Monomer, diluent, catalyst and comonomer can be continuously fed to a loop reactor where polymerization occurs. Generally, continuous processes can comprise the continuous introduction of a monomer, a catalyst, comonomer and a diluent into a polymerization reactor and the continuous removal from this reactor of a suspension comprising polymer particles and the diluent. Reactor effluent can be flashed to separate the solid polymer from the liquids that comprise the diluent, monomer and co-monomer. Various technologies can be used for this separation step including but not limited to, flashing that can include any combination of heat addition and pressure reduction; separation by cyclonic action in either a cyclone or hydrocyclone; or separation by centrifugation.

A suitable slurry polymerization process (also known as the particle form process) is disclosed, for example, in U.S. Pat. Nos. 3,248,179; 4,501,885; 5,565,175; 5,575,979; 6,239,235; 6,262,191; and 6,833,415; each of which is incorporated by reference herein in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor can comprise at least one gas phase reactor. Such systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Gas phase reactors are disclosed in U.S. Pat. Nos. 4,588,790; 5,352,749; and 5,436,304; each of which is incorporated by reference herein in its entirety.

According to still another aspect of the disclosure, a high pressure polymerization reactor can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect of the disclosure, the polymerization reactor can comprise a solution polymerization reactor wherein the monomer is contacted with the catalyst composition by suitable stirring or other means. A carrier comprising an inert organic diluent or excess monomer can be employed. If desired, the monomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactors suitable for the present disclosure can further comprise any combination of at least one raw material feed system, at least one feed system for catalyst or catalyst components, and/or at least one polymer recovery system. Suitable reactor systems for the present disclosure can further comprise systems for feedstock purification, catalyst storage and preparation, extrusion, reactor cooling, polymer recovery, fractionation, recycle, storage, loadout, laboratory analysis, and process control.

Conditions (e.g., polymerization conditions) that are controlled for polymerization efficiency and to provide resin properties include temperature, pressure, time, and concentrations of various reactants. Polymerization temperature can affect catalyst productivity, polymer molecular weight and molecular weight distribution. Suitable polymerization temperature can be any temperature below the de-polymerization temperature according to the Gibbs free energy equation. Typically, this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1,000 psig. Pressure for gas phase polymerization is usually at about 200 psig to about 500 psig. High pressure polymerization in tubular or autoclave reactors is generally run at about 20,000 psig to about 75,000 psig. Polymerization reactors can also be operated in a supercritical region occurring at generally higher temperatures and pressures. Operation above the critical point of a pressure/temperature diagram (supercritical phase) can offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, short chain branching, long chain branching and rheological parameters.

The concentrations of monomer, comonomer, hydrogen, co-catalyst, and modifiers can be utilized in producing specific resin properties. Comonomer can be used to control product density. Hydrogen can be used to control product molecular weight. Co-catalysts can be used to alkylate, scavenge poisons and/or control molecular weight. Modifiers can be used to control product properties. In addition, the concentration of poisons can be minimized because poisons can impact the reactions and product properties. In an embodiment, hydrogen is added to the reactor during polymerization. Alternatively, hydrogen is not added to the reactor during polymerization.

Any catalyst composition capable of producing a PE copolymer of the type disclosed herein can be employed in the production of the copolymer. In an embodiment, a method of preparing a PE copolymer comprises contacting an ethylene monomer and an olefin and/or alpha-olefin comonomer with a catalyst system in a polymerization reactor system under polymerization conditions to produce a polyethylene copolymer of the type disclosed herein.

In an embodiment, the catalyst system comprises a transition-metal complex. The terms "catalyst composition," "catalyst mixture," "catalyst system," and the like, do not depend upon the actual product resulting from the contact or reaction of the components of the mixtures, the nature of the active catalytic site, or the fate of the co-catalyst, the catalyst, any olefin monomer used to prepare a precontacted mixture, or the activator-support, after combining these components. Therefore, the terms "catalyst composition," "catalyst mixture," "catalyst system," and the like, can include both heterogeneous compositions and homogenous compositions.

In an embodiment, a catalyst system suitable for the preparation of a PE copolymer of the type disclosed herein comprises at least one metallocene-containing compound. Herein, the term "metallocene" describes a compound comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this disclosure comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like.

In an embodiment, a catalyst system suitable for the preparation of a PE copolymer of the type disclosed herein comprises at least two metallocene-containing compounds, also referred to as a dual metallocene catalyst system. Nonlimiting examples of metallocene-containing compounds suitable for use in this disclosure are described in more detail in U.S. Pat. Nos. 4,939,217; 5,191,132; 5,210,352; 5,347,026; 5,399,636; 5,401,817; 5,420,320; 5,436,305; 5,451,649; 5,496,781; 5,498,581; 5,541,272; 5,554,795; 5,563,284; 5,565,592; 5,571,880; 5,594,078; 5,631,203; 5,631,335; 5,654,454; 5,668,230; 5,705,478; 5,705,579; 6,187,880; 6,509,427; 7,026,494, and U.S. Patent App. Nos. 20100190926 A1 and 20120059134; each of which is incorporated by reference herein in its entirety. Other processes to prepare metallocene compounds suitable for use in this disclosure have been reported in references such as: Koppl, A. Alt, H. G. J. Mol. Catal. A. 2001, 165, 23; Kajigaeshi, S.; Kadowaki, T.; Nishida, A.; Fujisaki, S. The Chemical Society of Japan, 1986, 59, 97; Alt, H. G.; Jung, M.; Kehr, G. J. Organomet. Chem. 1998, 562, 153-181; and Alt, H. G.; Jung, M. J. Organomet. Chem. 1998, 568, 87-112; each of which is incorporated by reference herein in its entirety. The following treatises also describe such methods: Wailes, P. C.; Coutts, R. S. P.; Weigold, H. in Organometallic Chemistry of Titanium, Zirconium, and Hafnium, Academic; New York, 1974.; Cardin, D. J.; Lappert, M. F.; and Raston, C. L.; Chemistry of Organo-Zirconium and -Hafnium Compounds; Halstead Press; New York, 1986. In an embodiment, the PE copolymer of the type disclosed herein can be prepared using a catalyst system comprising two metallocene-containing compounds (i.e., a dual metallocene catalyst system) and can be characterized as a dual metallocene copolymer or a dual metallocene copolymer resin. In an embodiment such dual metallocene catalysts may be used to prepare bimodal resins of the type disclosed herein.

In an embodiment, the dual metallocene catalyst used for preparation of the PE copolymer of the type disclosed herein comprises an unbridged metallocene, designated MTE-A. In an embodiment, MTE-A is a compound that may be characterized by one of general formulas 1 or 2:

Formula 1

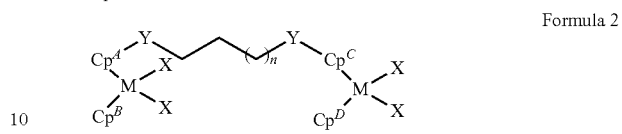

Formula 2 wherein each X is independently F, Cl, Br, I, methyl, benzyl, phenyl, H, $BH_4$, a hydrocarbyloxide group having up to 20 carbon atoms, a hydrocarbylamino group having up to 20 carbon atoms, a trihydrocarbylsilyl group having up to 20 carbon atoms, $OBR'_2$ wherein R' may be an alkyl group having up to 12 carbon atoms or an aryl group having up to 12 carbon atoms, and $SO_3R''$, wherein R'' may be an alkyl group having up to 12 carbon atoms or an aryl group having up to 12 carbon atoms; Y is a $CR_2$ or $SiR_2$ group where R is hydrogen or a hydrocarbyl group; $Cp^A$, $Cp^B$, $Cp^C$, and $Cp^D$ are each independently a substituted or unsubstituted cyclopentadienyl group or indenyl group, and where any substituent on $Cp^A$, $Cp^B$, $Cp^C$, and $Cp^D$ can be H, a hydrocarbyl group having up to 18 carbon atoms or a hydrocarbylsilyl group having up to 18 carbon atoms.

In an embodiment, MTE-A is a dinuclear compound wherein each metal moiety has the same structural characteristic described previously herein. In an embodiment, MTE-A is a nonbridged metallocene. Nonlimiting examples of compounds suitable for use in this disclosure as MTE-A are represented by structures (1)-(13):

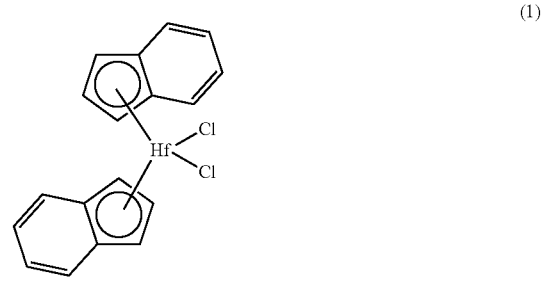

(1)

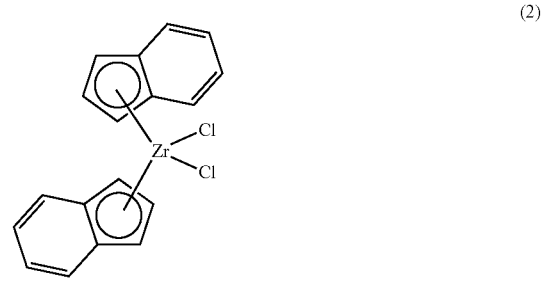

(2)

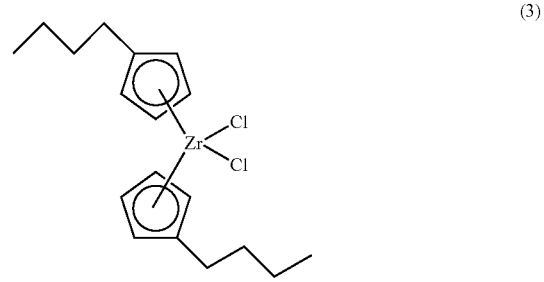

(3)

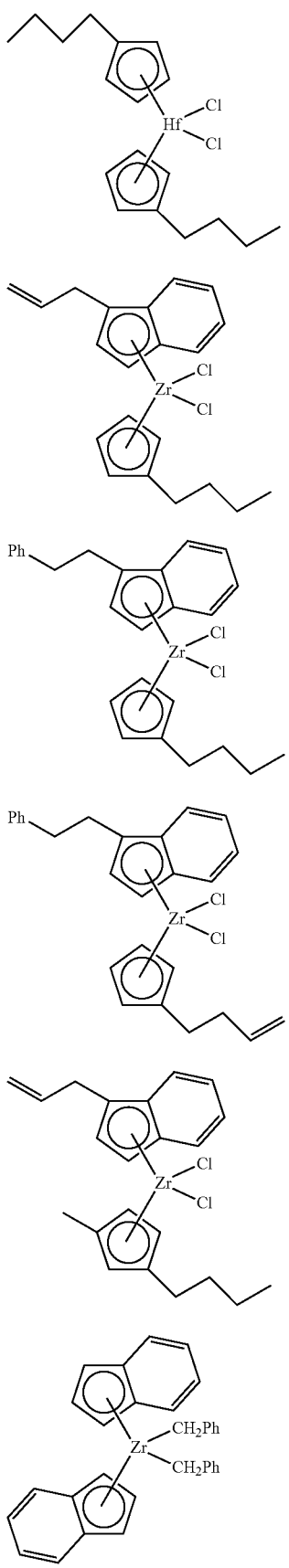
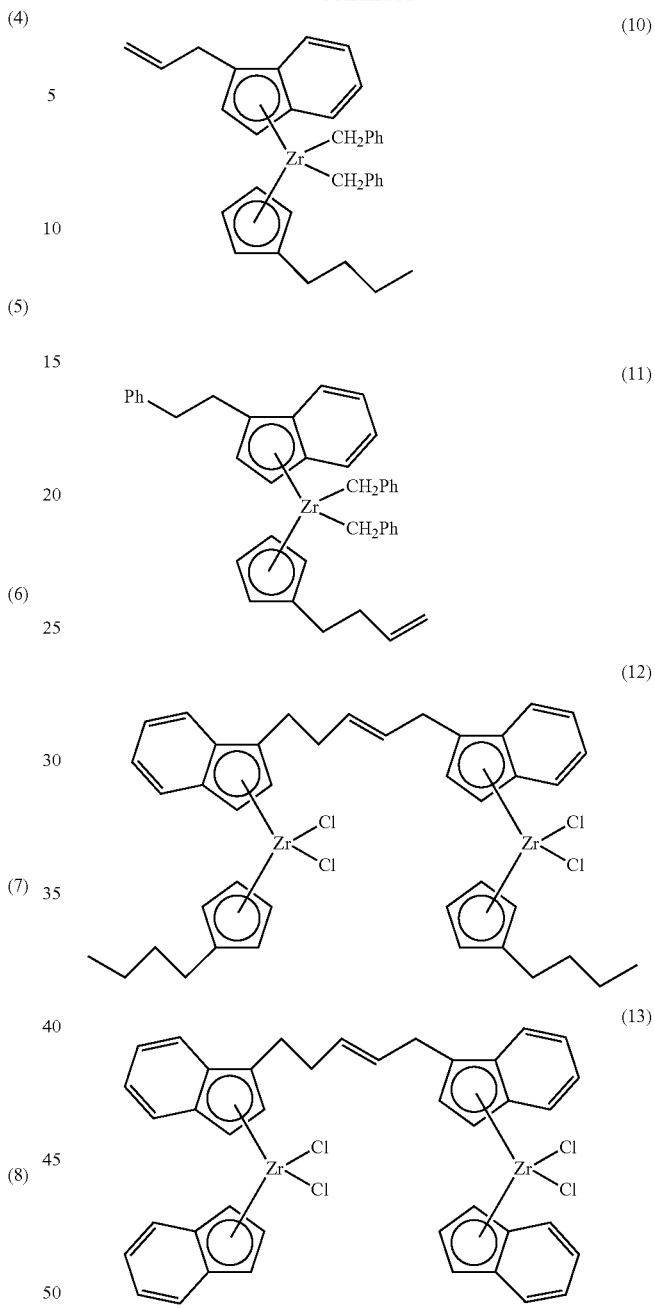

Other nonlimiting examples of metallocene compounds that may be suitably employed as MTE-A in a catalyst composition of the type disclosed herein include bis(cyclopentadienyl)hafnium dichloride; bis(n-butylcyclopentadienyl)bis(di-tbutylamido)hafnium; bis(n-propylcyclopentadienyl)zirconium dichloride; bis(pentamethylcyclopentadienyl)zirconium dichloride; bis(1-propylindenyl)zirconium dichloride; or any combination thereof.

In an embodiment, the dual metallocene catalyst used for preparation of the PE copolymer of the type disclosed herein further comprises a bridged metallocene compound hereinafter designated MTE-B. In an embodiment, MTE-B can be characterized by one of general formulas 3 or 4:

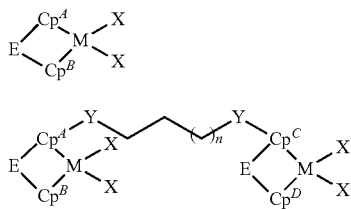

Formula 3

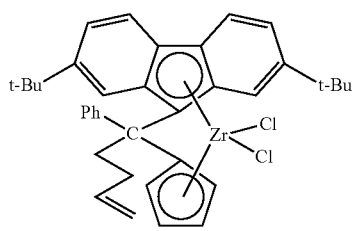

Formula 4 wherein M is Ti, Zr or Hf; each X is independently F, Cl, Br, I, methyl, phenyl, benzyl, H, BH$_4$, a hydrocarbyloxide group having up to 20 carbon atoms, a hydrocarbylamino group having up to 20 carbon atoms, a trihydrocarbylsilyl group having up to 20 carbon atoms, OBR'$_2$ wherein R' may be an alkyl group having up to 12 carbon atoms or an aryl group having up to 12 carbon atoms, or SO$_3$R" wherein R" may be an alkyl group having up to 12 carbon atoms or an aryl group having up to 12 carbon atoms; Y is a CR$_2$, SiR$_2$, or R$_2$CCR$_2$ group which may be linear or cyclic and where R is hydrogen or a hydrocarbyl group; Cp$^A$, Cp$^B$, Cp$^C$, and Cp$^D$ are each independently a substituted or unsubstituted cyclopentadienyl group, indenyl group, or flourenyl group and where any substituent on Cp$^A$, Cp$^B$, Cp$^C$, and Cp$^D$ can be H, a hydrocarbyl group having up to 18 carbon atoms or a hydrocarbylsilyl group having up to 18 carbon atoms. E represents a bridging group which may comprise (i) a cyclic or heterocyclic moiety having up to 18 carbon atoms, (ii) a group represented by the general formula E$^A$R$^{3A}$R$^{4A}$, wherein E$^A$ is C, Si, Ge, or B, and R$^{3A}$ and R$^{4A}$ are independently H or a hydrocarbyl group having up to 18 carbon atoms, (iii) a group represented by the general formula —CR$^{3B}$R$^{4B}$—CR$^{3C}$R$^{4C}$—, wherein R$^{3B}$, R$^{4B}$, R$^{3C}$, and R$^{4C}$ are independently H or a hydrocarbyl group having up to 10 carbon atoms, or (iv) a group represented by the general formula SiR$_2$—CR$_2$ where R is a hydrogen or hydrocarbyl group; or —SiR$^{3D}$R$^{4D}$—SiR$^{3E}$R$^{4E}$—, wherein R$^{3D}$, R$^{4D}$, R$^{3E}$, and R$^{4E}$ are independently H or a hydrocarbyl group having up to 10 carbon atoms, and wherein at least one of R$^{3A}$, R$^{3B}$, R$^{4A}$, R$^{4B}$, R$^{3C}$, R$^{4C}$, R$^{3D}$, R$^{4D}$, R$^{3E}$, R$^{4E}$, or the substituent on Cp$^A$, Cp$^B$, Cp$^C$, or Cp$^D$, is (1) a terminal alkenyl group having up to 12 carbon atoms or (2) a Binuclear compound wherein each metal moiety has the same structural characteristic as MTE-B.

Nonlimiting examples of compounds suitable for use in this disclosure as MTE-B are represented by structures (14)-(29):

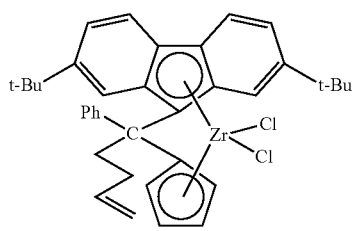

(14)

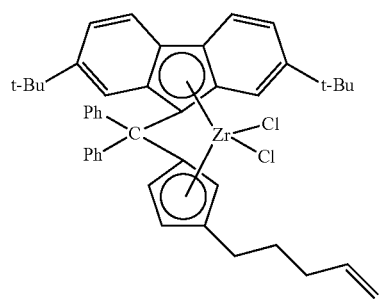

(15)

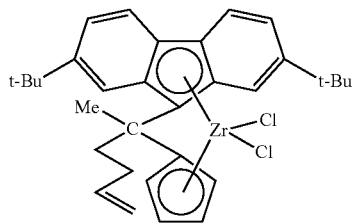

(16)

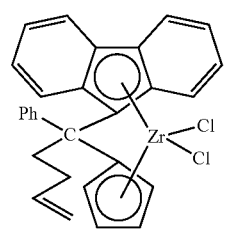

(17)

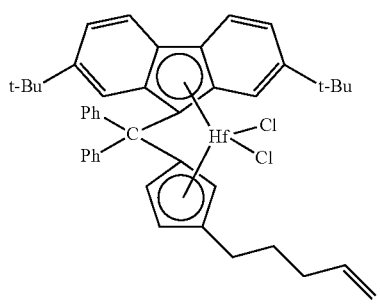

(18)

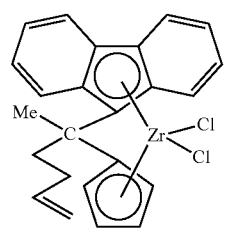

(19)

-continued
(20)
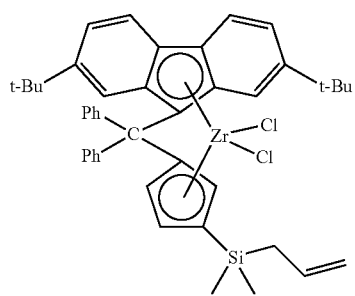
(21)
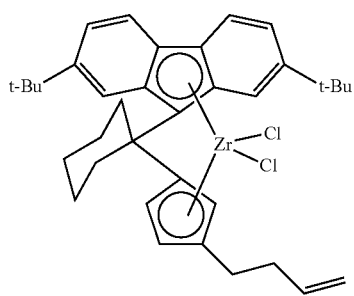
(22)
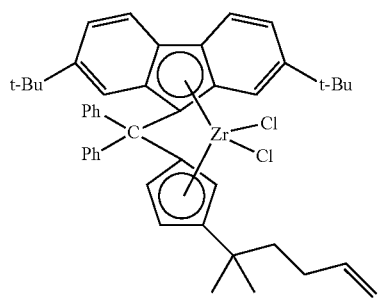
(23)
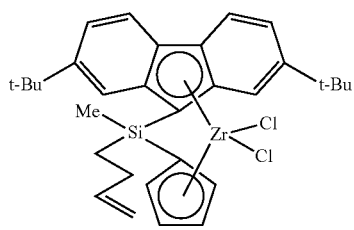
(24)
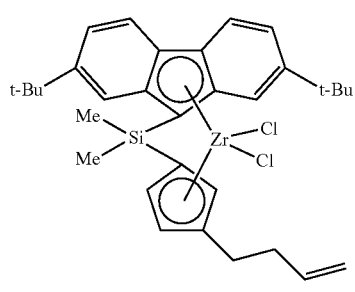
(25)
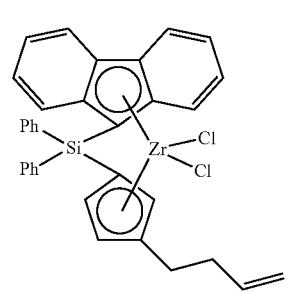
(26)
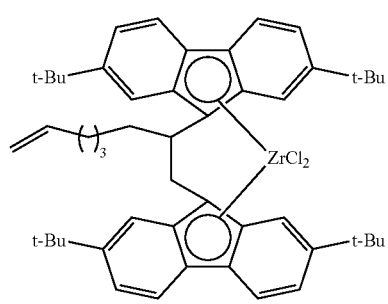
(27)
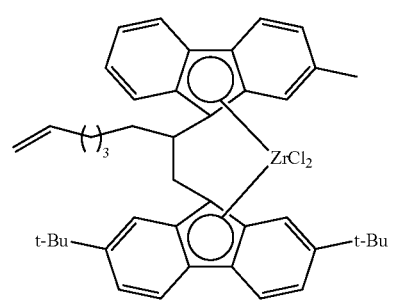
(28)
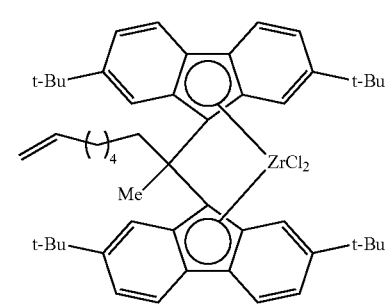

(29)

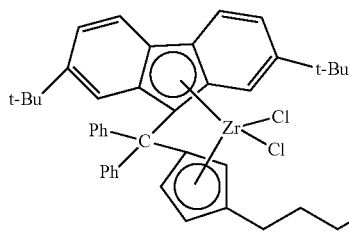 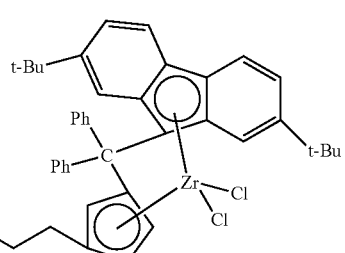

In an embodiment, a catalyst composition for the production of a PE copolymer of the type disclosed herein can further comprise an activator-support and/or an organoaluminum compound.

In one aspect, the activator-support comprises a chemically-treated solid oxide support. Alternatively, the activator-support can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof. The term "support" is not meant to be construed as an inert component of the catalyst composition, but rather is to be considered an active part of the catalyst composition, because of its intimate association with the metallocene component.

Generally, chemically-treated solid oxides exhibit enhanced acidity as compared to the corresponding untreated solid oxide compounds. The chemically-treated solid oxide can also function as a catalyst activator as compared to the corresponding untreated solid oxide. While the chemically-treated solid oxide activates the metallocene(s) in the absence of co-catalysts, it is not necessary to eliminate co-catalysts from the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of an organoaluminum compound, aluminoxanes, organoboron or organoborate compounds, ionizing ionic compounds, and the like.

The chemically-treated solid oxide can comprise a solid oxide treated with an electron-withdrawing anion. Without wishing to be limited by theory, it is believed that treatment of the solid oxide with an electron-withdrawing component augments or enhances the acidity of the oxide. Thus, either the activator-support exhibits Lewis or Brønsted acidity that is typically greater than the Lewis or Brønsted acid strength of the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

Chemically-treated solid oxides of this disclosure are formed generally from an inorganic solid oxide that exhibits Lewis acidic or Brønsted acidic behavior and has a relatively high porosity. The solid oxide is chemically-treated with an electron-withdrawing component, typically an electron-withdrawing anion, to form an activator-support.

In an embodiment, the solid oxide suitable for use in the present disclosure to prepare the chemically-treated solid oxide can be characterized by a pore volume of greater than about 0.1 cc/g, alternatively greater than about 0.5 cc/g, or alternatively greater than about 1.0 cc/g.

In an embodiment, the solid oxide suitable for use in the present disclosure to prepare the chemically-treated solid oxide can be characterized by a surface area of from about 100 $m^2/g$ to about 1000 $m^2/g$, alternatively from about 200 $m^2/g$ to about 800 $m^2/g$, or alternatively from about 250 $m^2/g$ to about 600 $m^2/g$.

In an embodiment, the chemically-treated solid oxide can comprise a solid inorganic oxide comprising oxygen and one or more elements selected from Group 2, 3, 4, 5, 6, 7, 8, 9, 10, 11, 12, 13, 14, or 15 of the periodic table, or comprising oxygen and one or more elements selected from the lanthanide or actinide elements (See: Hawley's Condensed Chemical Dictionary, 11th Ed., John Wiley & Sons, 1995; Cotton, F. A., Wilkinson, G., Murillo, C. A., and Bochmann, M., Advanced Inorganic Chemistry, 6th Ed., Wiley-Interscience, 1999). For example, the inorganic oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Nonlimiting examples of solid oxide materials or compounds that can be used to form the chemically-treated solid oxide suitable for use in the present disclosure include $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, or combinations thereof. For example, the solid oxide can comprise silica, alumina, silica-alumina, silica-coated alumina, aluminum phosphate, aluminophosphate, heteropolytungstate, titania, zirconia, magnesia, boria, zinc oxide, mixed oxides thereof, or any combinations thereof.

The solid oxide of this disclosure encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound. Nonlimiting examples of mixed oxides suitable for use in the activator-support of the present disclosure include silica-alumina, silica-titania, silica-zirconia, zeolites, various clay minerals, alumina-titania, alumina-zirconia, zinc-aluminate, alumina-boria, silica-boria, aluminophosphate-silica, titania-zirconia, and the like, or combinations thereof. The solid oxide of this disclosure also encompasses oxide materials such as silica-coated alumina, as described in U.S. Pat. No. 7,884,163, which is incorporated herein by reference in its entirety.

In an embodiment, the silica-alumina suitable for use in the present disclosure to prepare a chemically-treated silica-alumina can be characterized by a pore volume of greater than about 0.5 cc/g, alternatively greater than about 0.8 cc/g, or alternatively greater than about 1.0 cc/g.

In an embodiment, the silica-alumina suitable for use in the present disclosure to prepare the chemically-treated silica-alumina can be characterized by a surface area of greater than about 100 m²/g to about 1000 m²/g, alternatively greater than about 250 m²/g, or alternatively greater than about 350 m²/g.

In an embodiment, the silica-alumina suitable for use in the present disclosure to prepare the chemically-treated silica-alumina can be characterized by an alumina content of from about 5 wt. % to about 95 wt. %, based on the total weight of the silica-alumina. In some embodiments, the silica-alumina suitable for use in the present disclosure to prepare the chemically-treated silica-alumina can be characterized by an alumina content of from about 5 wt. % to about 50 wt. %, alternatively from about 8 wt. % to about 30 wt. %, based on the total weight of the silica-alumina. In other embodiments, the silica-alumina suitable for use in the present disclosure to prepare the chemically-treated silica-alumina can be characterized by an alumina content of from about 60 wt. % to about 90 wt. %, alternatively from about 65 wt. % to about 80 wt. %, based on the total weight of the silica-alumina. In yet other embodiments, the solid oxide component can comprise alumina without silica. In still yet other embodiments, the solid oxide component can comprise silica without alumina.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect of the present disclosure, the electron-withdrawing component is an electron-withdrawing anion derived from a salt, an acid, or other compound, such as a volatile organic compound, that serves as a source or precursor for that anion. Nonlimiting examples of electron-withdrawing anions suitable for use in the present disclosure include sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, and the like, mixtures thereof, or combinations thereof. In addition, other ionic or non-ionic compounds that serve as sources for these electron-withdrawing anions can also be employed in the present disclosure. It is contemplated that the electron-withdrawing anion can be, or can comprise, fluoride, chloride, bromide, phosphate, triflate, bisulfate, or sulfate, and the like, or any combination thereof, in some aspects of this disclosure. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or any combination thereof.

Thus, for example, the activator-support (e.g., chemically-treated solid oxide) suitable for use in the catalyst compositions of the present disclosure can be, or can comprise, fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In one aspect, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, and the like, or any combination thereof. In another aspect, the activator-support comprises fluorided alumina; alternatively, comprises chlorided alumina; alternatively, comprises sulfated alumina; alternatively, comprises fluorided silica-alumina; alternatively, comprises sulfated silica-alumina; alternatively, comprises fluorided silica-zirconia; alternatively, comprises chlorided silica-zirconia; or alternatively, comprises fluorided silica-coated alumina. In yet another aspect of the present disclosure, the activator-support suitable for use in the catalyst compositions of the present disclosure can be, or can comprise, alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid; or any combination of the above. Further, any of these activator-supports optionally can be treated with a metal ion.

When the electron-withdrawing component comprises a salt of an electron-withdrawing anion, the counterion or cation of that salt can be selected from any cation that allows the salt to revert or decompose back to the acid during calcining. Factors that dictate the suitability of a particular salt to serve as a source for the electron-withdrawing anion include, but are not limited to, the solubility of the salt in a desired solvent, the lack of adverse reactivity of the cation, ion-pairing effects between the cation and anion, hygroscopic properties imparted to the salt by the cation, and the like, and thermal stability of the anion. Nonlimiting examples of cations suitable for use in the present disclosure in the salt of the electron-withdrawing anion include ammonium, trialkyl ammonium, tetraalkyl ammonium, tetraalkyl phosphonium, H$^+$, [H(OEt$_2$)$_2$]$^+$, and the like, or combinations thereof.

Further, combinations of one or more different electron-withdrawing anions, in varying proportions, can be used to tailor the specific acidity of the activator-support to a desired level. Combinations of electron-withdrawing components can be contacted with the oxide material simultaneously or individually, and in any order that affords the desired chemically-treated solid oxide acidity. For example, one aspect of this disclosure is employing two or more electron-withdrawing anion source compounds in two or more separate contacting steps.

In one aspect of this disclosure, one example of a process by which a chemically-treated solid oxide is prepared is as follows: a selected solid oxide, or combination of solid oxides, can be contacted with a first electron-withdrawing anion source compound to form a first mixture; such first mixture can be calcined and then contacted with a second electron-withdrawing anion source compound to form a second mixture; the second mixture can then be calcined to form a treated solid oxide. In such a process, the first and second electron-withdrawing anion source compounds can be either the same or different compounds.

According to another aspect of the present disclosure, the chemically-treated solid oxide comprises a solid inorganic oxide material, a mixed oxide material, or a combination of inorganic oxide materials, that is chemically-treated with an electron-withdrawing component, and optionally treated with a metal source, including metal salts, metal ions, or other metal-containing compounds. Nonlimiting examples of the metal or metal ion suitable for use in the present disclosure include zinc, nickel, vanadium, titanium, silver, copper, gallium, tin, tungsten, molybdenum, zirconium, and the like, or combinations thereof. Nonlimiting examples of chemically-treated solid oxides that contain a metal or metal ion suitable for use in the present disclosure include chlorided zinc-impregnated alumina, fluorided titanium-impregnated alumina, fluorided zinc-impregnated alumina, chlorided zinc-impregnated silica-alumina, fluorided zinc-impregnated silica-alumina, sulfated zinc-impregnated alumina, chlorided zinc aluminate, fluorided zinc aluminate, sulfated zinc aluminate, silica-coated alumina treated with hexafluorotitanic acid, silica-coated alumina treated with zinc and then fluorided, and the like, or any combination thereof.

Any suitable method of impregnating the solid oxide material with a metal can be used. The method by which the oxide is contacted with a metal source, typically a salt or metal-containing compound, can include, but is not limited to, gelling, co-gelling, impregnation of one compound onto another, and the like, or combinations thereof. If desired, the metal-containing compound is added to or impregnated into the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, and the like, or combinations thereof. For example, zinc is often used to impregnate the solid oxide because it can provide improved catalyst activity at a low cost.

The solid oxide can be treated with metal salts or metal-containing compounds prior to, concurrent with, and/or subsequent to the solid oxide being treated with the electron-withdrawing anion. Following any contacting method, the contacted mixture of solid compound, electron-withdrawing anion, and the metal ion is typically calcined. Alternatively, a solid oxide material, an electron-withdrawing anion source, and the metal salt or metal-containing compound are contacted and calcined simultaneously.

Various processes can be used to form the chemically-treated solid oxide suitable for use in the present disclosure. The chemically-treated solid oxide can comprise the contact product of one or more solid oxides with one or more electron-withdrawing anion sources. As will be appreciated by one of skill in the art, and with the help of this disclosure, it is not required that the solid oxide be calcined prior to contacting the electron-withdrawing anion source. The contact product can be typically calcined either concurrent with or subsequent to the solid oxide being contacted with the electron-withdrawing anion source. The solid oxide can be calcined or uncalcined. Various processes to prepare solid oxide activator-supports suitable for use in the present disclosure are described in more detail in U.S. Pat. Nos. 6,107,230; 6,165,929; 6,294,494; 6,300,271; 6,316,553; 6,355,594; 6,376,415; 6,388,017; 6,391,816; 6,395,666; 6,524,987; 6,548,441; 6,548,442; 6,576,583; 6,613,712; 6,632,894; 6,667,274; and 6,750,302; each of which is incorporated herein by reference in its entirety.

According to one aspect of the present disclosure, the solid oxide material can be chemically-treated by contacting it with an electron-withdrawing component, typically an electron-withdrawing anion source. Further, the solid oxide material optionally can be chemically treated with a metal ion, and then calcined to form a metal-containing or metal-impregnated chemically-treated solid oxide. According to another aspect of the present disclosure, the solid oxide material and electron-withdrawing anion source can be contacted and calcined simultaneously.

The method by which the oxide is contacted with the electron-withdrawing component, typically a salt or an acid of an electron-withdrawing anion, can include, but is not limited to, gelling, co-gelling, impregnation of one compound onto another, and the like, or combinations thereof. Thus, following any contacting method, the contacted mixture of the solid oxide, electron-withdrawing anion, and optional metal ion, can be calcined.

According to one aspect of the present disclosure, the solid oxide activator-support (i.e., chemically-treated solid oxide) can be produced by a process comprising: (i) contacting a solid oxide (or solid oxides) with an electron-withdrawing anion source compound (or compounds) to form a first mixture; and (ii) calcining the first mixture to form the solid oxide activator-support.

According to another aspect of the present disclosure, the solid oxide activator-support (i.e., chemically-treated solid oxide) can be produced by a process comprising: (i) contacting a solid oxide (or solid oxides) with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the solid oxide activator-support.

According to yet another aspect of the present disclosure, the solid oxide activator-support (i.e., chemically-treated solid oxide) can be produced or formed by contacting the solid oxide with the electron-withdrawing anion source compound, wherein the solid oxide compound can be calcined prior to, concurrent with, and/or subsequent to contacting the electron-withdrawing anion source, and wherein there is a substantial absence of aluminoxanes, organoboron or organoborate compounds, and ionizing ionic compounds.

Generally, calcining of the chemically-treated solid oxide can be conducted in an ambient atmosphere, typically in a dry ambient atmosphere, at a temperature from about 200° C. to about 900° C., and for a time of from about 1 minute to about 100 hours. Calcining can be conducted at a temperature of from about 300° C. to about 800° C., or alternatively, at a temperature of from about 400° C. to about 700° C. Calcining can be conducted for about 30 minutes to about 50 hours, or for about 1 hour to about 15 hours. According to one aspect of this disclosure, calcining can be carried out for about 1 hour to about 10 hours at a temperature of from about 350° C. to about 550° C. Any suitable ambient atmosphere can be employed during calcining. Generally, calcining can be conducted in an oxidizing atmosphere, such as air. Alternatively, an inert atmosphere, such as nitrogen or argon, or a reducing atmosphere, such as hydrogen or carbon monoxide, can be used.

According to one aspect of the present disclosure, the solid oxide material can be treated with a source of halide ion, sulfate ion, or a combination of anions, optionally treated with a metal ion, and then calcined to provide the chemically-treated solid oxide in the form of a particulate solid. For example, the solid oxide material can be treated with a source of sulfate (termed a "sulfating agent"), a source of chloride ion (termed a "chloriding agent"), a source of fluoride ion (termed a "fluoriding agent"), or a combination thereof, and calcined to provide the solid oxide activator-support.

According to one aspect of the present disclosure, the chemically-treated solid oxide can comprise a fluorided solid oxide in the form of a particulate solid. The fluorided solid oxide can be formed by contacting a solid oxide with a fluoriding agent. Fluoride ions can be added to the oxide by forming a slurry of the oxide in a suitable solvent such as alcohol or water including, but not limited to, the one to three carbon alcohols because of their volatility and low surface tension. Nonlimiting examples of fluoriding agents suitable for use in the present disclosure include hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid (($NH_4)_2TiF_6$), hexafluorozirconic acid ($H_2ZrF_6$), $AlF_3$, $NH_4AlF_4$, analogs thereof, and the like, or combinations thereof. Triflic acid and ammonium triflate also can be employed. For example, ammonium bifluoride ($NH_4HF_2$) can be used as the fluoriding agent, due to its ease of use and availability.

If desired, the solid oxide can be treated with a fluoriding agent during the calcining step. Any fluoriding agent capable of thoroughly contacting the solid oxide during the calcining step can be employed. For example, in addition to those fluoriding agents described previously, volatile organic fluoriding agents can be used. Nonlimiting examples of volatile organic fluoriding agents suitable for use in the present disclosure include freons, perfluorohexane, perfluorobenzene, fluoromethane, trifluoroethanol, and the like, or combinations thereof. Calcining temperatures generally must be high enough to decompose the compound and release fluoride. Gaseous hydrogen fluoride (HF) or fluorine ($F_2$) itself also can be used with the solid oxide if fluoriding while calcining. Silicon tetrafluoride ($SiF_4$) and compounds containing tetrafluoroborate ($BF_4^-$) can also be employed. One convenient method of contacting the solid oxide with the fluoriding agent is to vaporize a fluoriding agent into a gas stream used to fluidize the solid oxide during calcining.

Similarly, according to another aspect of the present disclosure, the chemically-treated solid oxide can comprise a chlorided solid oxide in the form of a particulate solid. The chlorided solid oxide can be formed by contacting a solid oxide with a chloriding agent. Chloride ions can be added to the oxide by forming a slurry of the oxide in a suitable solvent. The solid oxide can be treated with a chloriding agent during the calcining step. Any chloriding agent capable of serving as a source of chloride and thoroughly contacting the oxide during the calcining step can be used, such as $SiCl_4$, $SiMe_2Cl_2$, $TiCl_4$, $BCl_3$, and the like, or combinations thereof volatile organic chloriding agents can also be employed. Examples of suitable volatile organic chloriding agents include, but are not limited to, certain freons (e.g., chlorine-containing freons), perchlorobenzene, chloromethane, dichloromethane, chloroform, carbon tetrachloride, trichloroethanol, and the like, or combinations thereof. Gaseous hydrogen chloride or chlorine itself can also be used with the solid oxide during calcining. One convenient method of contacting the oxide with the chloriding agent is to vaporize a chloriding agent into a gas stream used to fluidize the solid oxide during calcining.

According to one aspect of this disclosure, the amount of halide ions (e.g., fluoride, chloride, etc.) present prior to calcining the solid oxide can generally be from about 1 wt. % to about 50 wt. %, alternatively from about 1 wt. % to about 25 wt. %, alternatively from about 2 wt. % to about 20 wt. %, alternatively from about 4 wt. % to about 10 wt. %, by weight of the solid oxide (e.g., silica-alumina) prior to calcining. Once impregnated with halide, the halided solid oxide can be dried by any suitable method including, but not limited to, suction filtration followed by evaporation, drying under vacuum, spray drying, and the like, although it is also possible to initiate the calcining step immediately without drying the impregnated solid oxide (e.g., fluorided solid oxide, chlorided solid oxide, etc.).

Similarly, according to yet another aspect of the present disclosure, the chemically-treated solid oxide can comprise a sulfated solid oxide in the form of a particulate solid. The sulfated solid oxide can comprise a sulfate and a solid oxide component, such as alumina or silica-alumina, in the form of a particulate solid. Optionally, the sulfated solid oxide can be treated further with a metal ion such that the calcined sulfated oxide comprises a metal. According to one aspect of the present disclosure, the sulfated solid oxide comprises sulfate and alumina. In some instances, the sulfated alumina is formed by a process wherein the alumina is treated with a sulfate source, for example, sulfuric acid or a sulfate salt such as ammonium sulfate. This process is generally performed by forming a slurry of the alumina in a suitable solvent, such as alcohol or water, in which the desired concentration of the sulfating agent has been added. Suitable organic solvents include, but are not limited to, the one to three carbon alcohols because of their volatility and low surface tension.

According to one aspect of this disclosure, the amount of sulfate ions present prior to calcining the solid oxide can be from about 1 to about 25 parts by weight of sulfate ion to about 100 parts by weight of solid oxide. According to another aspect of this disclosure, the amount of sulfate ions present prior to calcining can be from about 2 to about 20 parts by weight of sulfate ion to about 100 parts by weight of solid oxide. According to yet another aspect of this disclosure, the amount of sulfate ions present prior to calcining can be from about 4 to about 10 parts by weight of sulfate ion to about 100 parts by weight of solid oxide. These weight ratios are based on the weight of the solid oxide prior to calcining. Once impregnated with sulfate, the sulfated solid oxide can be dried by any suitable method including, but not limited to, suction filtration followed by evaporation, drying under vacuum, spray drying, and the like, although it is also possible to initiate the calcining step immediately.

According to another aspect of the present disclosure, the activator-support suitable for use in preparing the catalyst compositions of this disclosure comprises an ion-exchangeable activator-support, including but not limited to silicate and aluminosilicate compounds or minerals, either with layered or non-layered structures, and combinations thereof. In another aspect of this disclosure, ion-exchangeable, layered aluminosilicates such as pillared clays can be used as activator-supports. When the acidic activator-support comprises an ion-exchangeable activator-support, it can optionally be treated with at least one electron-withdrawing anion such as those disclosed previously herein, though typically the ion-exchangeable activator-support is not treated with an electron-withdrawing anion.

According to another aspect of the present disclosure, the activator-support suitable for use in the catalyst compositions of the present disclosure can be, or can comprise, a pillared clay, such as a pillared montmorillonite, optionally treated with fluoride, chloride, or sulfate; phosphated alumina or other aluminophosphates optionally treated with sulfate, fluoride, or chloride; or any combination of the above. Further, any of these activator-supports optionally can be treated with a metal ion, as previously disclosed herein for the solid oxide activator-support.

According to another aspect of the present disclosure, the activator-support of this disclosure comprises clay minerals having exchangeable cations and layers capable of expanding. Typical clay mineral activator-supports include, but are not limited to, ion-exchangeable, layered aluminosilicates such as pillared clays.

According to yet another aspect of the present disclosure, the clay materials of this disclosure encompass materials either in their natural state or that have been treated with various ions by wetting, ion exchange, or pillaring. Typically, the clay material activator-support of this disclosure comprises clays that have been ion exchanged with large cations, including polynuclear, highly charged metal complex cations. However, the clay material activator-supports of this disclosure also encompass clays that have been ion exchanged with simple salts, including, but not limited to, salts of Al(III), Fe(II), Fe(III), and Zn(II) with ligands such as halide, acetate, sulfate, nitrate, or nitrite.

According to one aspect of the present disclosure, the activator-support comprises a pillared clay. The term "pillared clay" is used to refer to clay materials that have been ion exchanged with large, typically polynuclear, highly charged metal complex cations. Nonlimiting examples of such ions include Keggin ions which can have charges such as 7+, various polyoxometallates, and other large ions. Thus, the term "pillaring" refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Pillaring and pillared clays are described in more detail in: T. J. Pinnavaia, Science 220 (4595), 365-371 (1983); J. M. Thomas, Intercalation Chemistry, (S. Whittington and A. Jacobson, Eds.) Ch. 3, pp. 55-99, Academic Press, Inc., (1972); U.S. Pat. Nos. 4,452,910; 5,376, 611; and 4,060,480; each of which is incorporated herein by reference in its entirety.

The pillaring process utilizes clay minerals having exchangeable cations and layers capable of expanding. Any pillared clay that can enhance the polymerization of olefins in the catalyst composition of the present disclosure can be used. Therefore, suitable clay minerals for pillaring include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; fibrous clays including but not limited to sepiolites, attapulgites, and palygorskites; a serpentine clay; illite; laponite; saponite; and any combination thereof. In one aspect, the pillared clay activator-support comprises bentonite or montmorillonite. The principal component of bentonite is montmorillonite.

In some aspects of this disclosure, the pillared clay can be pretreated. For example, a pillared bentonite can be pretreated by drying at about 300° C. under an inert atmosphere, typically dry nitrogen, for about 3 hours, before being added to the polymerization reactor. Although an exemplary pretreatment is described herein, it should be understood that the pretreating can be carried out at many other temperatures and times, including any combination of temperature and time steps, all of which are encompassed by this disclosure.

The activator-support used to prepare the catalyst compositions of the present disclosure can be combined with other inorganic support materials, including, but not limited to, zeolites, inorganic oxides, phosphated inorganic oxides, and the like. In one aspect, typical support materials that can be used include, but are not limited to, silica, silica-alumina, alumina, titania, zirconia, magnesia, boria, thoria, aluminophosphate, aluminum phosphate, silica-titania, coprecipitated silica/titania, mixtures thereof, or any combination thereof.

In an embodiment, a process of making activator-supports comprising inorganic support materials can include precipitation, co-precipitation, impregnation, gelation, pore-gelation, calcining (at up to 900° C.), spray-drying, flash-drying, rotary drying and calcining, milling, sieving, and the like, or combinations thereof.

In an embodiment, an organoaluminum compound suitable for use in the present disclosure comprises an alkylaluminum compound. For example, the organoaluminum compound can comprise a trialkylaluminum compound, having the general formula $AlR_3$. Nonlimiting examples of trialkylaluminum compounds suitable for use in the present disclosure include triisobutylaluminum (TiBA or TiBAl); tri-n-butylaluminum (TNBA); tri-octly-butylaluminum (TOBA); triethylaluminum (TEA); and/or other appropriate alkyl-aluminum complexes, or combinations thereof. Additionally, partially hydrolyzed alkylaluminum compounds and/or aluminoxanes can be used. In an embodiment, the organoaluminum compound comprises a compound represented by the general formula:

$$Al(X^1)_p(X^2)_q$$

wherein $X^1$ is a halide, hydrocarbyloxide group, hydrocarbylamino group or combinations thereof; $X^2$ is a hydrocarbyl group having up to 18 carbon atoms; p ranges from 0 to 2; and q is (3-p).

The polymer or resin (e.g., PE copolymer) can be formed into various articles, including, but not limited to pipes, bottles, toys, containers, utensils, film products, drums, tanks, membranes, sheet, and liners. Various processes can be used to form these articles, including, but not limited to, extrusion, molding, rotational molding, injection molding, fiber spinning, thermoforming, blown film, cast film, blow molding, and the like. After polymerization, additives and modifiers can be added to the copolymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

The PE copolymer can include any other suitable additives. Such additives can be used singularly or in combination and can be included in the copolymer composition before, during or after preparation of the PE copolymer as described herein. Such additives can be added via known techniques, for example during an extrusion or compounding step such as during pelletization or subsequent processing into an end use article. Herein the disclosure will refer to a PE copolymer although a copolymer composition comprising the PE copolymer and one or more additives is also contemplated.

In an embodiment, the PE copolymer can comprise a crosslinked metallocene-catalyzed polyethylene (PE) copolymer. In such embodiment, the crosslinked metallocene-catalyzed PE copolymer can be obtained by contacting a base resin (e.g., a PE copolymer base resin) with an additive, such as for example a peroxide modifier. As used herein, a "base resin" refers to a resin that has not undergone a modification to improve processability of the type described herein. In other words, base resin refers to the PE copolymer starting material that is accessed and modified according to the present disclosure. Accordingly, the base resin may include virgin PE copolymer resin or reactor "fluff" as recovered from a polymerization process and prior to the addition of any additives or modifiers and/or includes PE copolymer resin recovered from a polymerization process that has undergone further processing such as pelletization, which may include the addition of a base additive package of the type commonly added to commercial PE copolymer resins (e.g., antioxidants, stabilizer, etc.).

In an embodiment, a PE copolymer base resin can be treated with a peroxide modifier (e.g., a peroxide modifier can be added to a PE copolymer base resin) to yield a crosslinked metallocene-catalyzed PE copolymer.

In an embodiment, a PE copolymer base resin can be treated with a peroxide modifier (e.g., a peroxide modifier can be added to a PE copolymer base resin) to yield a peroxide induced crosslinked metallocene-catalyzed PE copolymer.

In an embodiment, the peroxide modifier comprises an organic peroxide. Nonlimiting examples of peroxide modifiers suitable for use in the present disclosure include 2,5-dimethyl-2,5-di(tert-butylperoxy)hexane; 1,1-di(tert-butylperoxy)cyclohexane; 1,1-di(tert-amylperoxy)cyclohexane; 1,1-di-(tert-butylperoxy)-3,3,5-trimethylcyclohexane; tert-butylperoxy 2-ethylhexyl carbonate; di-2-ethylhexyl peroxydicarbonate; tert-amyl peroxypivalate; tert-butyl peroxypivalate; di-(3,5,5-trimethylhexanoyl) peroxide; dilauroylperoxide; didecanoyl peroxide; 1,1,3,3-tetramethylbutyl-peroxy-2-ethylhexanoate; dibenzoyl peroxide; 2,5-dimethyl-2,5-di(2-ethylhexanoyl peroxy)hexane; tert-amyl peroxy-2-ethylhexanoate; tert-butyl peroxy-2-ethylhexanoate; tert-butyl peroxy isobutyrate; OO-t-amyl-O-(2-ethylhexyl monoperoxy-carbonate); OO-t-butyl O-isopropyl monoperoxy-carbonate; OO-t-butyl-O-(2-ethylhexyl) monoperoxy-carbonate; butyl 4,4-di(t-butylperoxy)valerate; ethyl 3,3-di-(t-butylperoxy)butyrate; and the like; or combinations thereof.

In an embodiment, the peroxide modifier can improve the processability of the PE copolymer (e.g., crosslinked metallocene-catalyzed PE copolymer), as will be disclosed in more detail later herein. Without wishing to be limited by theory, the peroxide modifier crosslinks the copolymer chains and creates long chain branching, thereby improving melt properties of the PE copolymer without increasing the average molecular weight of the copolymer. As will be appreciated by one of skill in the art, and with the help of this disclosure, higher molecular weight polymers could impart desired physical and/or mechanical properties to manufactured articles (e.g., pipes); however, higher molecular weight polymers are more difficult to process. Further, without wishing to be limited by theory, crosslinking the PE copolymer by using peroxides could have an effect similar to the higher molecular weight polymers on physical and/or mechanical properties of manufactured articles and improved melt strength and slump resistance, without altering the processability of the copolymer.

In an embodiment, the crosslinked metallocene-catalyzed PE copolymer comprises crosslinks. In such embodiment, the crosslinks can be due to the treatment of a PE copolymer base resin with a peroxide modifier to yield the crosslinked metallocene-catalyzed PE copolymer. In an embodiment, the crosslinks can comprise C—C bonds established between polymer strands or chains in any pattern. As will be appreciated by one of skill in the art, and with the help of this disclosure, the peroxide modifier can initiate radical forming reactions, thereby creating radicals on the polymer strands that enable the formation of C—C bonds between polymer strands. Further, as will be appreciated by one of skill in the art, and with the help of this disclosure, any single polymer strand can be crosslinked to more than one other polymer strand.

In an embodiment, the peroxide modifier can be employed (e.g., added to a PE copolymer of the type described herein) as a powder, as a master batch, in a carrier (e.g., polypropylene, calcium carbonate, etc.), or combinations thereof.

In an embodiment, a PE copolymer base resin can be contacted with from about 25 ppm to about 400 ppm of peroxide modifier, alternatively from about 50 ppm to about 350 ppm of peroxide modifier, or alternatively from about 100 ppm to about 300 ppm of peroxide modifier, based on the total weight of the PE copolymer base resin. As will be appreciated by one of skill in the art, and with the help of this disclosure, the peroxide modifier is added to the base resin during a processing step (e.g., extrusion, pipe formation, etc.), and upon finalizing such processing step, the resulting crosslinked metallocene-catalyzed PE copolymer does not contain any substantial amount of peroxide modifier, as the peroxide modifier is consumed and/or decomposes during the processing step. Without wishing to be limited by theory, the half-life of the peroxide modifier is short enough such that by the end of the processing step wherein the peroxide modifier was employed, no or substantially no peroxide modifier can be found in the resulting crosslinked metallocene-catalyzed PE copolymer. In an embodiment, the crosslinked metallocene-catalyzed PE copolymer, after processing to add the peroxide modifier, comprises less than about 300 ppm peroxide modifier, alternatively less than about 200 ppm peroxide modifier, alternatively less than about 100 ppm peroxide modifier, alternatively less than about 50 ppm peroxide modifier, alternatively less than about 10 ppm peroxide modifier, alternatively less than about 1 ppm peroxide modifier, alternatively less than about 0.1 ppm peroxide modifier, or alternatively less than about 0.01 ppm peroxide modifier, based on the total weight of the crosslinked metallocene-catalyzed PE copolymer.

In an embodiment, a monomer (e.g., ethylene) and comonomer can be polymerized using the methodologies disclosed herein to produce a copolymer of the type disclosed herein (e.g., crosslinked metallocene-catalyzed PE copolymer). In an embodiment, the comonomer can comprise unsaturated hydrocarbons having from 3 to 20 carbon atoms. In an embodiment, the PE copolymer is a polymer of ethylene with one or more comonomers such as alpha olefins. Nonlimiting examples of alpha olefins suitable for use as comonomers in the present disclosure include propylene, 1-butene, 1-pentene, 1-hexene, 3-methyl-1-butene, 4-methyl-1-pentene, 1-heptene, 1-octene, 1-nonene, 1-decene, and the like, and combinations thereof. In an embodiment, the comonomer comprises 1-butene, 1-hexene, 1-octene, or combinations thereof. In an embodiment, the comonomer comprises 1-hexene.

In an embodiment, crosslinked metallocene-catalyzed PE copolymer of the type described herein can comprise a comonomer in an amount of greater than about 0.5 wt. %, alternatively greater than about 0.6 wt. %, or alternatively greater than about 1 wt. %, based on the total weight of the copolymer.

In an embodiment, the crosslinked metallocene-catalyzed PE copolymer of the type described herein can be characterized by a density of from about 0.925 g/cc to about 0.945 g/cc, alternatively from about 0.930 g/cc to about 0.942 g/cc, or alternatively from about 0.934 g/cc to about 0.939 g/cc, as determined in accordance with ASTM D1505.

In an embodiment, the crosslinked metallocene-catalyzed PE copolymer of the type described herein is a bimodal resin. Herein, the "modality" of a copolymer resin (e.g., crosslinked metallocene-catalyzed PE copolymer) refers to the form of its molecular weight distribution curve, i.e., the appearance of the graph of the copolymer weight fraction, frequency, or number as a function of its molecular weight. The copolymer weight fraction refers to the weight fraction of molecules of a given size. A copolymer resin can have two or more components that can be distinguishable from one another, for example based upon their individual composition and/or molecular weight distribution. A molecular weight distribution curve can be prepared for each individual component of the copolymer resin.

The molecular weight distribution curves for the individual components can be superimposed onto a common chart to form the weight distribution curve for the polymer resin as a whole. Upon such superimposition, the resultant curve for the polymer resin as a whole can be multimodal or show n distinct peaks corresponding to n polymer components of differing molecular weight distributions. For example, a polymer having a molecular weight distribution curve showing a single peak can be referred to as a unimodal polymer, a polymer having a curve showing two distinct peaks can be referred to as a bimodal polymer, a polymer having a curve showing three distinct peaks can be referred to as a trimodal polymer, etc. Polymers having molecular weight distribution curves showing more than one peak can be collectively referred to as multimodal polymers (e.g., multimodal copolymers) or resins. Furthermore, the distinct peaks can correspond to components exhibiting distinct characteristics. For example, a bimodal polymer (e.g., bimodal copolymer) resin can show two distinct peaks corresponding to two individual components of differing molecular weights. Polymer modality can be determined using any suitable methodology, such as for example as described in ASTM D6474. Polymer modality could be determined by using size exclusion chromatography (SEC) and/or gel permeation chromatography (GPC).

In an embodiment, the crosslinked metallocene-catalyzed PE copolymer is a bimodal PE copolymer resin. In such embodiment, the PE copolymer comprises a higher molecular weight (HMW) component and a lower molecular weight (LMW) component. In such embodiment, the HMW component can be present in the PE copolymer in an amount of from about 10 wt. % to about 30 wt. %, alternatively from about 15 wt. % to about 25 wt. %, or alternatively from about 18 wt. % to about 22 wt. %, based on the total weight of the copolymer; while the LMW component can be present in the PE copolymer in an amount of from about 70 wt. % to about 90 wt. %, alternatively from about 75 wt. % to about 85 wt. %, or alternatively from about 78 wt. % to about 82 wt. %, based on the total weight of the copolymer. The individual components of the copolymer composition (e.g., crosslinked metallocene-catalyzed PE copolymer) can be obtained by deconvoluting a GPC of the copolymer as described in U.S. Publication No. 20070298508 A1, which is incorporated by reference herein in its entirety.

In an embodiment, a crosslinked metallocene-catalyzed PE copolymer of the type described herein can be characterized by a weight average molecular weight ($M_w$) of from about 150 kg/mol to about 250 kg/mol; alternatively of from about 170 kg/mol to about 240 kg/mol; or alternatively of from about 190 kg/mol to about 230 kg/mol; a number average molecular weight ($M_n$) of from about 15 kg/mol to about 40 kg/mol, alternatively from about 18 kg/mol to about 37 kg/mol; or alternatively from about 20 kg/mol to about 35 kg/mol; and a z-average molecular weight ($M_z$) of from about 600 kg/mol to about 800 kg/mol, alternatively from about 615 kg/mol to about 790 kg/mol; or alternatively from about 620 kg/mol to about 780 kg/mol. The weight average molecular weight describes the size average (e.g., molecular weight distribution) of a polymer composition and can be calculated according to equation 1:

$$M_w = \frac{\sum_i N_i M_i^2}{\sum_i N_i M_i} \quad (1)$$

wherein $N_i$ is the number of molecules of molecular weight $M_i$. All molecular weight averages are expressed in gram per mole (g/mol) or Daltons (Da), or in kg/mol or kDa. The number average molecular weight is the common average of the molecular weights of the individual polymers and can be calculated by measuring the molecular weight $M_i$ of $N_i$ polymer molecules, summing the weights, and dividing by the total number of polymer molecules, according to equation 2:

$$M_n = \frac{\sum_i N_i M_i}{\sum_i N_i} \quad (2)$$

wherein $N_i$ is the number of molecules of molecular weight $M_i$. The z-average molecular weight is a higher order molecular weight average which is calculated according to equation 3:

$$M_z = \frac{\sum_i N_i M_i^3}{\sum_i N_i M_i^2} \quad (3)$$

wherein $N_i$ is the number of molecules of molecular weight A.

In an embodiment, a crosslinked metallocene-catalyzed PE copolymer of the type described herein can be characterized by a molecular weight distribution (MWD) of from about 4 to about 18, alternatively from about 6 to about 16, or alternatively from about 8 to about 14. The MWD is the ratio of the $M_w$ to the $M_n$ ($M_w/M_n$), which can also be referred to as the polydispersity index (PDI) or more simply as polydispersity.

In an embodiment, a crosslinked metallocene-catalyzed PE copolymer of the type described herein can be further characterized by a melt index (MI) under a force of 2.16 kg of from about 0.2 gram per 10 minutes (g/10 min) to about 0.8 g/10 min, alternatively from about 0.25 g/10 min to about 0.75 g/10 min, or alternatively from about 0.3 g/10 min to about 0.7 g/10 min. The melt index refers to the amount of a polymer which can be forced through a melt indexer orifice of 0.0825 inch diameter when subjected to the indicated force in ten minutes at 190° C., as determined in accordance with ASTM D1238.

In an embodiment, a crosslinked metallocene-catalyzed PE copolymer of the type described herein can be further characterized by a melt index ($I_5$) under a force of 5 kg of from about 1 g/10 min to about 4 g/10 min, alternatively from about 1.5 g/10 min to about 3.5 g/10 min, or alternatively from about 2 g/10 min to about 3 g/10 min.

In an embodiment, a crosslinked metallocene-catalyzed PE copolymer of the type described herein can be further characterized by a high load melt index (HLMI) under a force of 21.6 kg of from about 6 g/10 min to about 25 g/10 min, alternatively from about 6 g/10 min to about 20 g/10 min, alternatively from about 8 g/10 min to about 21 g/10 min, or alternatively from about 11 g/10 min to about 17 g/10 min.

In an embodiment, a crosslinked metallocene-catalyzed PE copolymer of the type described herein can be characterized by a Carreau-Yasuda 'a' parameter of from about 0.1 to about 0.8, alternatively from about 0.2 to about 0.7, or alternatively from about 0.2 to about 0.6. The Carreau-Yasuda 'a' parameter (CY-a) is defined as a rheological breadth parameter. Rheological breadth refers to the breadth of the transition region between Newtonian and power-law type shear rate for a polymer or the frequency dependence of the viscosity of the polymer. The rheological breadth is a function of the relaxation time distribution of a polymer, which in turn is a function of the polymer molecular structure or architecture. The CY-a parameter can be obtained by assuming the Cox-Merz rule and calculated by fitting flow curves generated in linear-viscoelastic dynamic oscillatory frequency sweep experiments with a modified Carreau-Yasuda (CY) model, which is represented by equation 4:

$$|\eta^*(\omega)| = \eta_o [1 + (\tau_\eta \omega)^a]^{\frac{n-1}{a}} \quad (4)$$

wherein $|\eta^*(\omega)|$=magnitude of the complex shear viscosity (Pa-s);

$\eta_o$=zero shear viscosity (Pa-s) [defines the Newtonian plateau];

$\omega$=angular frequency of oscillatory shear deformation (i.e., shear rate (1/s));

$a$=rheological breadth parameter;

$\tau_\eta$=viscous relaxation time (s) [describes the location in time of the transition region];

n=power law constant [defines the final slope of the high shear rate region].

To facilitate model fitting, the power law constant n is held at a constant value (i.e., 0.1818). The dynamic shear viscosities can be measured experimentally, and the data can be fit to the CY equation 4 to determine $\eta_o$ values and other rheological parameters. Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987), each of which is incorporated by reference herein in its entirety.

The zero shear viscosity ($\eta_o$) or eta_0 refers to the viscosity of the copolymer at a zero shear rate and is indicative of the molecular structure of materials. Further, for polymer melts, the zero shear viscosity is often a useful indicator of processing attributes such as slump resistance in pipe extrusion, melt strength in blow-molding and foam technologies and bubble stability in film blowing. For example, the higher the zero shear viscosity, the better the melt strength or bubble stability. In an embodiment, a crosslinked metallocene-catalyzed PE copolymer of the type described herein can be characterized by a zero shear viscosity ($\eta_o$), defined by equation 4, in the range of from about $5.0 \times 10^4$ Pa-s to about $8.0 \times 10^5$ Pa-s, alternatively from about $5.0 \times 10^4$ Pa-s to about $7.0 \times 10^5$ Pa-s, or alternatively from about $6.0 \times 10^4$ Pa-s to about $7.0 \times 10^5$ Pa-s.

In an embodiment, a crosslinked metallocene-catalyzed PE copolymer of the type described herein can be characterized by a viscous relaxation time ($\tau_\eta$), defined by equation 4, of from about 0.4 seconds to about 11 seconds, alternatively from about 0.5 seconds to about 9 seconds, alternatively from about 0.5 seconds to about 8 seconds, or alternatively from about 0.6 seconds to about 7 seconds. The relaxation rate refers to the viscous relaxation times of the copolymer and is indicative of a distribution of relaxation times associated with the wide distribution of molecular weights.

In an embodiment, a crosslinked metallocene-catalyzed PE copolymer of the type described herein can be further characterized by $\eta_{100}$ (eta_100) of from about 1,000 Pa-s to about 4,000 Pa-s, alternatively from about 1,000 Pa-s to about 3,500 Pa-s, alternatively from about 1,500 Pa-s to about 3,000 Pa-s, or alternatively from about 2,000 Pa-s to about 3,000 Pa-s, wherein $\eta_{100}$ is the viscosity of the copolymer expressed in Pa-s and measured at 190° C. and a shear rate of 100 rad/s. As will be appreciated by one of skill in the art, and with the help of this disclosure, improvements in processing (e.g., improved processability) can include a decrease in head pressure during an extrusion process. The viscosity at 100 rad/s is a useful indicator that correlates with the extrusion pressure in polymer processes: the lower the $\eta_{100}$, the lower the head pressure, the more improved the processability.

In an embodiment, a crosslinked metallocene-catalyzed PE copolymer of the type described herein can be characterized by a Young's modulus of from about 120 kpsi to about 190 kpsi, alternatively from about 125 kpsi to about 185 kpsi, or alternatively from about 130 kpsi to about 180 kpsi. Young's modulus, which is also known as tensile modulus or elastic modulus, can be expressed in kpsi and is a measure of the stiffness of a material, and is generally defined as the ratio of the stress along an axis over the strain along that axis in the range of stress in which Hooke's law applies (e.g., the ratio of the rate of change of stress with strain). Young's modulus of a PE copolymer can be determined experimentally from the slope of a stress-strain curve created during tensile tests conducted on a sample of a material in accordance with ASTM D638 and/or ISO 527.

In an embodiment, a crosslinked metallocene-catalyzed PE copolymer of the type described herein can be further characterized by a tensile strength at break of greater than about 3,500 psi, alternatively greater than about 4,000 psi, alternatively greater than about 4,500 psi, alternatively from about 3,500 psi to about 6,000 psi, alternatively from about 4,000 psi to about 5,500 psi, or alternatively from about 4,500 psi to about 5,000 psi. Generally, the tensile strength at break (also known as breaking strength) of a material (e.g., a polymer) can be defined as the maximum longitudinal stress a material (e.g., a polymer) can withstand before tearing (e.g., before the material or copolymer breaks), and is commonly expressed in psi. Further, the tensile strength at break refers to the tensile stress at the moment the material is destroyed. The tensile strength at break of a PE copolymer can be determined in accordance with ASTM D638 and/or ISO 527.

In an embodiment, a crosslinked metallocene-catalyzed PE copolymer of the type described herein can be further characterized by a tensile strength at yield of from about 2,600 psi to about 3,000 psi, alternatively from about 2,650 psi to about 2,950 psi, or alternatively from about 2,700 psi to about 2,900 psi. Generally the tensile strength at yield (also known as yield point) of a material (e.g., a polymer) can be defined as the stress at which a material (e.g., a polymer) begins to deform plastically (as opposed to elastically), and is commonly expressed in psi. Further, the tensile strength at yield refers to the tensile stress where an increase in expansion is admitted without an increase in gaining the weight on a stress-strain curve. The tensile strength at yield of a PE copolymer can be determined in accordance with ASTM D638 and/or ISO 527.

In an embodiment, a crosslinked metallocene-catalyzed PE copolymer of the type described herein can be further characterized by a percent elongation at break of greater than about 450%, alternatively greater than about 500%, alternatively greater than about 550%, alternatively from about 450% to about 800%, alternatively from about 500% to about 700%, or alternatively from about 550% to about 650%. Generally, the percent elongation at break (also known as breaking strength or fracture strain) of a material (e.g., a polymer) can be defined as the percentage ratio between changed length and initial length after breakage of the test specimen (e.g., material, polymer). The percent elongation at break expresses the capability of a material to resist changes of shape without crack formation. Further, the elongation at break refers to the elongation which corresponds to the tensile breaking strength. The percent elongation at break of a PE copolymer can be determined in accordance with ASTM D638 and/or ISO 527.

In an embodiment, a crosslinked metallocene-catalyzed PE copolymer of the type described herein can be further characterized by a percent elongation at yield of from about 8.0% to about 20%, alternatively from about 10% to about 17%, or alternatively from about 10% to about 15%. Generally, the percent elongation at yield of a material (e.g., a polymer) can be defined as the percentage ratio between the length at the yield point and the initial length of the test specimen (e.g., material, polymer), and is commonly expressed in psi. The percent elongation at yield of a PE copolymer can be determined in accordance with ASTM D638 and/or ISO 527.

In an embodiment, a crosslinked metallocene-catalyzed PE copolymer of the type described herein can be further characterized by an oxidative induction time (OIT) of greater than about 100 minutes (min), alternatively from about 100 min to about 350 min, alternatively from about 150 min to about 300 min, or alternatively from about 190 min to about 285 min. Generally, OIT can be defined as the time between melting of a material (e.g., a polymer) and the onset of decomposition under isothermal conditions, and is commonly expressed in min. Usually, the atmosphere is nitrogen up to melting and then oxygen. OIT generally measures the level of thermal stabilization of the material (e.g., a polymer) tested and can be conducted by differential scanning calorimetry (DSC). The OIT of a PE copolymer can be determined in accordance with ASTM D3895.

In an embodiment, a crosslinked metallocene-catalyzed PE copolymer of the type described herein can be further characterized by an oxidative induction temperature of greater than about 220° C., alternatively from about 220° C. to about 325° C., alternatively from about 225° C. to about 325° C., alternatively from about 235° C. to about 325° C., or alternatively from about 250° C. to about 325° C. Generally, the oxidative induction temperature of a material (e.g., polymer) can be defined as the temperature of the onset of oxidation. The oxidative induction temperature of a material (e.g., polymer) can be measured by DSC and is commonly expressed in ° C. The oxidative induction temperature of a PE copolymer can be determined in accordance with ASTM D3895.

In an embodiment, a crosslinked metallocene-catalyzed PE copolymer of the type described herein can be further characterized by having gels present in an amount of less than about 300 gels/square foot (sq.ft.), alternatively less than about 250 gels/sq.ft., or alternatively less than about 200 gels/sq.ft., wherein the gels can have a size greater than about 200 microns. Generally, gels are higher molecular weight and/or crosslinked polymers (e.g., polyethylene) in the form of discrete particles. Gels in the PE copolymer were measured by extruding a 1 mm thick cast film on a 1.25" Killion single screw extruder with a slot die. An FS5 model OCS (Optical Control Systems, GmbH) gel counter with a light source was used in transmission mode with the grey level set at 170 to detect the number of gels greater than about 200 microns in size.

Polymers of the type disclosed herein (e.g., PE copolymers) can be formed into articles of manufacture or end-use articles using any suitable techniques known in the art such as extrusion, blow molding, injection molding, fiber spinning, thermoforming, and casting. Polymers of the type disclosed herein (e.g., PE copolymers) can display an improved processability, when processed in the presence of peroxide modifiers.

In an embodiment, the copolymer comprises PE (e.g., PE copolymers) which may be fabricated into a pipe by extrusion. Extrusion refers to a method of making a polymeric pipe comprising extruding the polymer or copolymer in a molten state through a die to cool and form the polymeric pipe. Hereinafter the disclosure will refer to PE copolymer pipe although other polymeric articles are also contemplated.

Pipe extrusion in the simplest terms is performed by conveying solid polymer pellets through the action of a rotating screw followed by the compaction and melting of the pellets through the application of heat and shear forces; the homogenous polymer melt is then conveyed to a die to form the ultimately desired profile. For the fabrication of pipes the extrudate (melt exiting the die), which is annular in shape, is then formed and cooled through a series of vacuum and water cooling tanks. There are numerous kinds of feedstocks in pipe extrusion. The polymer feedstock can either be a pre-pigmented polyethylene resin or it can be a mixture of natural polyethylene and color concentrate (referred to as "Salt and Pepper blends"). In North America, the most common feedstock for pipe extrusion is "Salt and Pepper blends". In Europe and other areas of the world, the most common feedstock for pipe extrusion is pre-pigmented polyethylene resin. Feedstock is rigidly controlled to obtain the proper finished product (pipe) and ultimate consumer specifications. In one "salt and pepper blend" embodiment, the color concentrate is a polyethylene carrier resin loaded with up to 40 weight percent carbon black particles; this concentrate is introduced to maintain approximately 2.5 weight percent carbon black concentration in the final pipe. In another "salt and pepper blend" embodiment, the color concentrate is a polyethylene carrier resin loaded with yellow or other color pigments, and the concentrate is introduced at up to 2.0 weight percent concentration of the final formulation.

The feedstock is then fed into an extruder. The most common extruder system for pipe production is a single-screw extruder. The purpose of the extruder is to melt, homogenize and convey the polyethylene pellets. Extrusion temperatures typically range from 170° C. to 260° C., depending upon the extruder screw design and flow properties of the polyethylene.

In an embodiment, the feedstock comprises a PE copolymer base resin of the type disclosed herein and a peroxide modifier of the type and amounts disclosed herein to yield a crosslinked metallocene-catalyzed PE copolymer having properties as described herein.

The molten polymer (e.g., molten crosslinked metallocene-catalyzed PE copolymer) is then passed through an annular die to shape the melt. The molten polymer, in the form of an annulus, is then usually forced through a shaping or forming tank while simultaneously being cooled from the outside using a water spray. While the pipe diameter is a direct consequence of the die and sizing sleeve dimensions, the pipe wall thickness depends on the die gap and also the draw-down speed employed.

Next, the pipe is cooled and solidified in the desired dimensions. Cooling is accomplished by the use of several water tanks where the outside pipe is either submerged in water or water is sprayed on the pipe exterior. The pipe is cooled from the outside surface to the inside surface. The interior wall and inside surfaces of the pipe can stay hot for a long period of time, as polyethylene is a poor conductor of heat. Finally, the crosslinked metallocene-catalyzed PE copolymer pipe is printed and either coiled or cut to length.

A lot of the field failures in pipe applications (e.g., pressure pipe applications) are attributable to slow crack growth (SCG). This has led to the development of many lab-scale tests, such as the Pennsylvania Edge-Notch Tensile Test (PENT; ASTM F1473), to predict the resistance to SCG of various polyethylenes. In the PENT test, a notched polyethylene specimen is subjected to creep by the application of a constant tensile load at 80° C. The applied load is such that the initial stress is 2.4 MPa or 3.8 MPa. The time to failure is recorded and reported. A longer failure time correlates with a greater resistance to SCG. Generally speaking, increasing the resin density lowers the PENT failure times. The resistance to slow crack growth can be quantified as failure times (e.g., PENT failure times).

In an embodiment, a crosslinked metallocene-catalyzed PE copolymer pipe of the type disclosed herein can display a resistance to slow crack growth of greater than about 500 h, alternatively greater than about 1,000 h, or alternatively greater than about 2000 h, wherein the resistance to slow crack growth is defined as the PENT failure time.

Since a lot of field failures in pipe applications (e.g., pressure pipes for gas transport) are attributable to a brittle fracture mode referred to as SCG, the resistance to SCG of pipes is often evaluated. One method of evaluating the SCG resistance is by determining the tensile natural draw ratio (tensile NDR) of the resin. There is some evidence that the tensile NDR is directly related to the SCG resistance of PE such that the lower the tensile NDR the higher the resistance to SCG. A description of the correlation of SCG to tensile NDR may be found in: E. Laurent, *Comprehensive Evaluation of the Long-Term Mechanical Properties of PE*100 *Resin Meeting the Requirements of Modern Installation Techniques*, Plastic Pipes XI Proceedings of the International Conference, Woodhead Publishing Limited (2001); and in an article by L. Hubert, et al published in 2002 in the Journal of Applied Polymer Science Volume 84 page 2308; each of which is incorporated by reference herein in its entirety.

In an embodiment, a crosslinked metallocene-catalyzed PE copolymer pipe of the type disclosed herein can display a tensile NDR of from about 380% to about 500%, alternatively from about 400% to about 475%, or alternatively from about 420% to about 450%. The tensile NDR can be determined by performing standard tensile stress-strain experiments on dog bone specimens at a deformation rate of 51 mm/min in accordance with ASTM D638.

A modified Charpy impact test, referred to as the Razor-Notched Charpy Impact Test, has emerged as a useful indicator of the resistance to rapid crack propagation (RCP) fractures. This modified Charpy test is described in detail in ASTM F2231. This test involves measuring the impact energy when a thin molded rectangular plaque (with a razor notch) is impacted by a swinging pendulum. This test can be performed at multiple temperatures; enabling one to determine the temperature at which the failure mode changes from ductile to brittle. The results from this test are as follows: (i) impact energy (in Joules) at room temperature and (ii) the lowest temperature at which the failure was clearly ductile (hinge break with an impact energy >0.15 J); for convenience, this temperature will be referred to as the Charpy temperature (e.g., Charpy ductile to brittle critical temperature, Charpy $T_{db}$). Generally speaking, a higher room-temperature impact energy and a lower Charpy $T_{db}$ means the ensuing pipe will have better RCP resistance. Charpy impact energy is a measure of an article's impact toughness.

In an embodiment, a crosslinked metallocene-catalyzed PE copolymer pipe of the type disclosed herein can display a Charpy $T_{db}$ temperature of from about −35° C. to about −10° C., alternatively from about −35° C. to about −15° C., or alternatively from about −30° C. to about −20° C.

In an embodiment, a crosslinked metallocene-catalyzed PE copolymer pipe of the type disclosed herein can display a Charpy impact energy of from about 0.9 J to about 3.0 J, alternatively from about 1.0 J to about 3.0 J, alternatively from about 0.9 J to about 2.5 J, or alternatively from about 1.6 J to about 2.0 J, as determined in accordance with ASTM F2231 razor-notched Charpy impact test at room temperature.

In an embodiment, a crosslinked metallocene-catalyzed PE copolymer pipe of the type disclosed herein can be characterized by the extent to which it can resist rapid crack propagation (RCP). The Small-Scale Steady-State (S4) test is the current standard for measuring the RCP resistance of polyethylene pipes. In the S4 test, the pipe specimens are seven diameters long and are sealed at both ends and pressurized with air. Typically, pipe specimens are conditioned externally at the test temperature, and then moved to the S4 rig for testing. A sharp chisel-edged striker impacts the pipe at one end and drives a fast-running crack through the main section of the pipe. While the crack propagates, internal disc baffles spaced along the pipe length suppress axial decompression ahead of it, so that the pressure at the crack-tip is approximately equal to the test pressure during the entire course of crack growth. This promotes steady-state crack growth. Further, in the S4 test, a containment cage around the specimen prevents flaring of the pipe. This also limits the failure mode to steady-state crack propagation while minimizing ductile transient bursting. The S4 test details and procedures are described in the ISO 13477 standard. The test can be performed at a fixed temperature to determine the critical pressure ($P_c$) required to sustain RCP. Alternatively, a series of tests at a given/fixed operating pressure (usually 5 bar) and at various temperatures can be used to measure the critical temperature ($T_c$) for RCP to be sustained. Generally speaking, the temperature of a pipe must be below a critical limit even for RCP to be initiated. Once RCP is initiated, the pressure within the pipe must exceed a critical value to sustain steady state crack propagation. Therefore, for a pipe, low S4 critical temperature (S4 $T_c$) and high S4 critical pressure (S4 $P_c$) will help minimize RCP failures. The lower the S4 critical temperature the better, since it results in a broader end-use temperature range for the pipe.

In an embodiment, a crosslinked metallocene-catalyzed PE copolymer pipe of the type disclosed herein, having a 2-inch nominal outer diameter with a standard diameter ratio (SDR=OD/t, where t=wall thickness) of about 11 (i.e., 2"DR11 pipe), can have a S4 critical temperature of from about −30° C. to about −10° C., alternatively from about −25° C. to about −15° C., or alternatively from about −25° C. to about −20° C., as determined in accordance with ISO 13477.

In an embodiment, a crosslinked metallocene-catalyzed PE copolymer pipe of the type disclosed herein, having a 2-inch nominal outer diameter with a standard diameter ratio (SDR=OD/t, where t=wall thickness) of about 11 (i.e., 2"DR11 pipe), can have a S4 critical pressure of greater than about 12 bar, alternatively greater than about 10 bar, or alternatively greater than about 5 bar, as determined at 0° C. in accordance with ISO 13477.

In an embodiment, a crosslinked metallocene-catalyzed PE copolymer of the type disclosed herein can display one or more types of melt fracture during polymer melt formation and processing such as extrusion molding. The type, extent, and conditions under which the polymer melt experiences melt fracture can vary depending on the polymer microstructure. Generally, melt fracture behavior of polymers can be investigated by using capillary rheometry.

Capillary rheometry is a technique whereby a sample undergoes extrusion through a die of defined dimensions and the shear pressure drop across the die is recorded at set volumetric flow rates. In an embodiment, a PE copolymer of the type disclosed herein can be subjected to a capillary extrusion experiment to characterize its melt fracture behavior. The capillary extrusion experiment may be carried out using any suitable methodology. For example, the capillary extrusion experiments may be carried out at 190° C., using a dual-bore capillary rheometer (Rosand RH-7, Malvern) operated in constant speed mode. A capillary die with 1 mm diameter and of 16 mm length and an orifice die with 1 mm diameter may be used. The entrance angle for the dies can be 180°, and the contraction ratio from the reservoir barrel to the die may be about 15. A step shear rate test can be performed for a given sample to obtain the apparent wall shear rate ($\dot{\gamma}_A$) and apparent wall shear stress ($\sigma_A$) according to equation 5:

$$\dot{\gamma}_A = \frac{4Q}{\pi R^3} \text{ and } \sigma_A = \frac{R}{2}\frac{\Delta P}{L} \qquad (5)$$

where R is the capillary radius, $\Delta P$ is the measured pressure drop across the capillary, L is the capillary length, and Q is the imposed flow rate. Bagley and Rabinowitsch corrections are applied to obtain more realistic shear stress value at the wall ($\sigma_W$) and shear rate ($\dot{\gamma}_W$) respectively according to equation 6:

$$\sigma_W = \frac{R}{2}\frac{(\Delta P - P_o)}{L} \text{ and } \dot{\gamma}_W = \left(\frac{3+b}{4}\right)\dot{\gamma}_A \qquad (6)$$

where $P_O$ is measured pressure for the orifice die and $b = d(\log \dot{\gamma}_A)/d(\log \sigma_W)$. Extrudates can be collected at different shear rates and imaged using an optical microscope to identify onset critical stresses and shear rates of the melt fractures.

As will be appreciated by one of skill in the art, and with the help of this disclosure, melt fracture experimental results performed by capillary rheometry, wherein various samples can be observed visually are a proxy for the melt fracture behavior of the polymer.

Generally, extruded plastic pipe leaving an annular die can be solidified in a long cooling tank by spraying the outer surface with cold water. The inside surface of the pipe can take a long time to solidify as the solidification progresses radially inward. This could result in flow of molten polymer down the inside of the pipe. This gravity flow of molten extrudate is called slumping, and it can cause serious non-uniformity in pipe wall thickness particularly in large diameter, thick walled pipes.

In an embodiment, a crosslinked metallocene-catalyzed PE copolymer of the type disclosed herein can be formed into pipes having a diameter of up to and greater than about 8 inches, alternatively greater than about 10 inches, or alternatively greater than about 12 inches. In such embodiment, the pipes formed from the crosslinked metallocene-catalyzed PE copolymer of the type disclosed herein can be substantially slump or sag free. In an embodiment, pipes formed from a PE copolymer (e.g., PE copolymer base resin) similar to the crosslinked metallocene-catalyzed PE copolymer of the type disclosed herein, but which has not been treated with the peroxide modifier, could present slump problems when the diameter of the pipes is greater than about 8 inches, alternatively greater than about 10 inches, or alternatively greater than about 12 inches. In an embodiment, a crosslinked metallocene-catalyzed PE copolymer pipe can be characterized by an uniform pipe wall thickness, wherein the pipe can have a diameter of up to and greater than about 8 inches, alternatively greater than about 10 inches, or alternatively greater than about 12 inches.

In an embodiment, a crosslinked metallocene-catalyzed PE copolymer of the type disclosed herein when formed into a pipe can have a magnitude of slip-stick pressure oscillation that is decreased by at least 0.5%, alternatively decreased by at least 1%, or alternatively decreased by at least 5% when compared to an otherwise similar PE copolymer base resin (e.g., PE copolymer that has not been treated with a peroxide modifier) that was formed into a pipe of similar dimensions. Slip-stick fractures (SSFs) are believed to occur when the shear stress at the die wall exceeds the critical stress. When this occurs, the melt jerks forward as a plug, relieving the pressure behind it and allowing the oriented chain segments to recoil somewhat. Once the pressure is relieved, the rate of movement of the polymer slows and it re-establishes the non-slip boundary condition. During SSF the pressure within the die fluctuates and the polymer output is unsteady. The magnitude of SSF pressure oscillation is recorded and correlated with the onset of melt fractures.

In an embodiment, a crosslinked metallocene-catalyzed PE copolymer of the type disclosed herein can display improved processability as indicated by the N_100 value which is the slope viscosity curve at 100 rad/s frequency. The N_100 is often a useful indicator of output in polymer processes. In an embodiment, a crosslinked metallocene-catalyzed PE copolymer of the type disclosed herein can have a N_100 that is increased by at least 2%, alternatively increased by at least 4%, or alternatively increased by at least 5% when compared to a N_100 of an otherwise similar PE copolymer that has not been treated with a peroxide modifier (e.g., PE copolymer base resin).

In an embodiment, the crosslinked metallocene-catalyzed PE copolymer can be a bimodal copolymer of ethylene with greater than about 0.5 wt. % 1-hexene, based on the total weight of the copolymer; catalyzed with a dual metallocene catalyst system comprising a MTE-A metallocene characterized by structure (5) and an MTE-B metallocene characterized by structure (15); and treated with 100 ppm 2,5-dimethyl-2,5-di(tert-butylperoxy)hexane, based on the total weight of the copolymer; wherein the HMW component is present in the copolymer in an amount of from about 15 wt. % to about 25 wt. %; and wherein the LMW component is present in the copolymer in an amount of from about 75 wt. % to about 85 wt. %, based on the total weight of the copolymer. In such embodiment, the crosslinked metallocene-catalyzed PE copolymer can be characterized by a $\eta_o$ of greater than about $1 \times 10^5$ Pa-s, and by a $\eta_{100}$ of greater than about 1,900 Pa-s.

In an embodiment, the crosslinked metallocene-catalyzed PE copolymer can be a bimodal copolymer of ethylene with greater than about 0.5 wt. % 1-hexene, based on the total weight of the copolymer; catalyzed with a dual metallocene catalyst system comprising a MTE-A metallocene characterized by structure (5) and an MTE-B metallocene characterized by structure (15); and treated with 200 ppm 2,5-dimethyl-2,5-di(tert-butylperoxy)hexane, based on the total weight of the copolymer; wherein the HMW component is present in the copolymer in an amount of from about 15 wt. % to about 25 wt. %; and wherein the LMW component is present in the copolymer in an amount of from about 75 wt. % to about 85 wt. %, based on the total weight of the copolymer. In such embodiment, the crosslinked metallocene-catalyzed PE copolymer can be characterized by $\eta_o$ of greater than about $2 \times 10^5$ Pa-s, and by a $\eta_{100}$ of greater than about 1,900 Pa-s.

In an embodiment, the crosslinked metallocene-catalyzed PE copolymer can be a bimodal copolymer of ethylene with greater than about 0.5 wt. % 1-hexene, based on the total weight of the copolymer; catalyzed with a dual metallocene catalyst system comprising a MTE-A metallocene characterized by structure (5) and an MTE-B metallocene characterized by structure (15); and treated with 300 ppm 2,5-dimethyl-2,5-di(tert-butylperoxy)hexane, based on the total weight of the copolymer; wherein the HMW component is present in the copolymer in an amount of from about 15 wt. % to about 25 wt. %; and wherein the LMW component is present in the copolymer in an amount of from about 75 wt. % to about 85 wt. %, based on the total weight of the copolymer. In such embodiment, the crosslinked metallocene-catalyzed PE copolymer can be characterized by a $\eta_o$ of greater than about $3.5 \times 10^5$ Pa-s, and by a $\eta_{100}$ of greater than about 2,000 Pa-s.

In an embodiment, the pipes produced from copolymers of this disclosure (e.g., crosslinked metallocene-catalyzed PE copolymers) can advantageously display improved mechanical properties (e.g., impact properties, resistance to crack propagation, etc.) and processability (e.g., low slump or sagging), as compared to pipes produced from otherwise similar PE copolymers that have not been treated with a peroxide modifier (e.g., PE copolymer base resin). In an embodiment, the pipes produced from copolymers of this disclosure (e.g., crosslinked metallocene-catalyzed PE copolymers) can advantageously have larger diameters (e.g., with preserving mechanical properties) when compared to pipes produced from otherwise similar PE copolymers that have not been treated with a peroxide modifier (e.g., PE copolymer base resin). Generally, larger diameter pipes can be manufactured from bimodal polymers with a high content of a HMW component. However, bimodal polymers with a high content of a HMW component are much more difficult to process (e.g., extrude) than bimodal polymers with a low content of a HMW component.

In an embodiment, the crosslinked metallocene-catalyzed PE copolymers can advantageously allow for the fabrication of pipes of up to and greater than 8 inches diameter at acceptable melt temperatures and without excessive slump. Further, the crosslinked metallocene-catalyzed PE copolymers can advantageously allow for the fabrication of pipes of up to and greater than 8 inches diameter while maintaining all the key performance properties required for medium density gas pipe applications. Such and additional advantages of the copolymers of this disclosure (e.g., crosslinked metallocene-catalyzed PE copolymers) can be apparent to one of skill in the art viewing this disclosure.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner. The following testing procedures were used to evaluate the various copolymers and compositions.

Copolymer density was determined in grams per cubic centimeter (g/cc) on a compression molded sample, cooled at about 15° C. per hour, and conditioned for about 40 hours at room temperature in accordance with ASTM D1505.

Molecular weight ($M_w$, $M_z$, and $M_n$) values were obtained using Gel Permeation Chromatography (GPC).

Melt index (e.g., MI, $I_5$, HLMI) was measured in accordance with ASTM D1238.

Tensile NDR was measured in accordance with ASTM D638.

Thermal stability was measured as oxidative induction temperature in accordance with ASTM D3895.

Gels were measured on a 1 mm thick cast film using an OCS Gel Counter.

The capillary melt fracture data was obtained from capillary rheometry experiments by using an optical microscope to identify onset critical stresses and shear rates of the melt fractures, as previously described herein.

Rheology measurements were made as follows: Strains were generally maintained at a single value throughout a frequency sweep, but larger strain values were used for low viscosity samples to maintain a measurable torque. Smaller strain values were used for high viscosity samples to avoid overloading the torque transducer and to keep within the linear viscoelasitc limits of the sample. The instrument automatically reduces the strain at high frequencies if necessary to keep from overloading the torque transducer. These data were fit to the Carreau-Yasuda equation to determine zero shear viscosity ($\eta_0$), viscous relaxation time ($\tau_\eta$), and a measure of the breadth of the relaxation time distribution (CY-a). The Carreau-Yasuda (CY) model is represented by Equation (4), as described previously herein. To facilitate model fitting, the power law constant n was held at a constant value of 0.1818.

Example 1

Copolymers of the type described herein (e.g., PE copolymer base resin, crosslinked metallocene-catalyzed PE copolymers) were prepared using 1-hexene as a comonomer and a catalyst system comprising a dual metallocene complex (e.g., MTE-A metallocene characterized by structure (5) and MTE-B metallocene characterized by structure (15)), a solid oxide activator-support (e.g., alumina SSA) and an organoaluminum compound (e.g., triisobutylaluminum (TiBA or TiBAl)). The metallocene characterized by structure (5) is an unbridged Zr metallocene, and the metallocene characterized by structure (15) is a bridged Zr metallocene. The conditions used for preparing various copolymer samples are outlined in Table 1.

TABLE 1

| Reactor Conditions | Sample ID# | | |
|---|---|---|---|
| | 1 | 2 | 3 |
| SSA to reactor (rounds/hr) | 35 | 39 | 39 |
| Metallocene B to reactor (ppm) | 0.48 | 0.32 | 0.31 |
| Metallocene A to reactor (ppm) | 1.35 | 1.36 | 0.97 |
| Autoclave residence time (min) | 25 | 29 | 30 |
| TiBA to Reactor (ppm) | 24 | 53 | 80 |

TABLE 1-continued

| Reactor Conditions | Sample ID# | | |
|---|---|---|---|
| | 1 | 2 | 3 |
| Reaction Temperature (° F.) | 191 | 192 | 192 |
| Ethylene (mol %) | 12 | 12 | 12 |
| 1-hexene (mol %) | 2 | 3 | 3 |
| $H_2$ feed rate (lb/hr) | 0.0022 | 0.0028 | 0.0028 |
| Ethylene feed rate (lb/hr) | 42 | 44 | 44 |
| 1-Hexene feed rate (lb/hr) | 3 | 2 | 3 |
| Total i-C4 flow rate (lb/hr) | 59 | 55 | 55 |
| Solids concentration (wt. %) | 35 | 40 | 39 |
| Polymer production (lb/hr) | 36.7 | 40.8 | 40.2 |
| Density (g/cc) | 0.9348 | 0.938 | 0.9388 |
| HLMI | 6.51 | 14.6 | 16.4 |

The PE copolymers of this invention were made using the dual metallocene catalyst in a single loop slurry reactor. Reactor conditions of temperature, hydrogen, hexene and catalyst ratios (as outlined in Table 1) were manipulated to obtain the low and the high molecular weight components at the desired ratio and MW location. The reactor fluff was then finished in a twin screw extruder with the primary and secondary antioxidants and peroxide modifier to obtain pellets which were then extruded with a pigment masterbatch to produce pipes up to 12" diameter.

Sample #1 was treated with various amounts of peroxide modifier (e.g., 2,5-dimethyl-2,5-di(tert-butylperoxy) hexane). Physical and mechanical properties of the PE copolymer base resin (sample #1) and of the crosslinked metallocene-catalyzed PE copolymers (sample #4, sample #5, and sample #6) were investigated and the results are presented in Table 2.

TABLE 2

| Sample ID# | Peroxide Modifier [ppm] | Gels #/sq. ft., >200 microns | Density [g/cc] | HLMI [g/10 min] | Tensile NDR [%] | $\eta_0$ [Pa · s] | Thermal Stability [° C.] |
|---|---|---|---|---|---|---|---|
| 1 | 0 | 20.5 | 0.9348 | 6.51 | 412 | 1.16E+05 | 267 |
| 4 | 55 | 26.7 | 0.9348 | 6.32 | 401 | 1.71E+05 | 261 |
| 5 | 110 | 25.3 | 0.9348 | 6.18 | 396 | 2.85E+05 | 266 |
| 6 | 220 | 118.7 | 0.9348 | 6.09 | 397 | 4.99E+05 | 268 |

The data from Table 2 indicate that while most physical properties of the PE copolymer base resin remain unaltered by the peroxide modifier such as density, HLMI, tensile NDR and thermal stability, some other properties that contribute to the processability of the copolymer do improve without an adverse impact of excessive gels. For example, the zero shear viscosity increases which improves the slump resistance in extruded pipe.

Example 2

Polymer sample #2 and sample #3 were treated with various amounts of peroxide modifier (e.g., 2,5-dimethyl-2, 5-di(tert-butylperoxy)hexane), and were subjected to rheology experiments. Estimated rheology parameters and melt temperature are displayed in Table 3. Sample #2 was treated with 100 ppm, 200 ppm, and 300 ppm peroxide modifier to yield sample #9, sample #10, and sample #11, respectively. Sample #3 was treated with 100 ppm, 200 ppm, and 300 ppm peroxide modifier to yield sample #12, sample #13, and sample #14, respectively. Sample #7 was a commercially available medium density polyethylene and was used as a control for comparison. Sample #8 was a PE copolymer base resin obtained in a similar manner to sample #1.

TABLE 3

| | Dynamic @190 | | | 2" pipe line | | 8" pipe line | | 12" pipe line | |
|---|---|---|---|---|---|---|---|---|---|
| Sample ID# | $\eta_0$ [Pa·s] | $\eta_{100}$ [Pa·s] | N_100 | Melt Temp [°F.] | $\eta_0$@ Melt Temp | Melt Temp [°F.] | $\eta_0$@ Melt Temp | Melt Temp [°F.] | $\eta_0$@ Melt Temp |
| 7 | 5.79E+05 | 1639 | 0.4194 | 439 | 3.36E+05 | 470 | 2.67E+05 | 430 | 3.61E+05 |
| 8 | 1.90E+05 | 2519 | 0.2577 | 502 | 6.91E+04 | 530 | 5.73E+04 | 480 | 8.05E+04 |
| 2 | 8.07E+04 | 2061 | 0.2969 | 469 | 3.70E+04 | 497 | 3.05E+04 | 457 | 4.06E+04 |
| 9 | 1.31E+05 | 2083 | 0.3048 | 471 | 5.93E+04 | 498 | 4.90E+04 | 458 | 6.51E+04 |
| 10 | 2.19E+05 | 2023 | 0.3078 | 466 | 1.03E+05 | 494 | 8.37E+04 | 454 | 1.12E+05 |
| 11 | 3.64E+05 | 2100 | 0.3086 | 472 | 1.65E+05 | 499 | 1.34E+05 | 459 | 1.81E+05 |
| 3 | 7.47E+04 | 1934 | 0.3098 | 460 | 3.66E+04 | 489 | 2.97E+04 | 449 | 4.02E+04 |
| 12 | 1.28E+05 | 1945 | 0.3179 | 461 | 6.29E+04 | 490 | 5.10E+04 | 449 | 6.82E+04 |
| 13 | 2.39E+05 | 1974 | 0.3212 | 463 | 1.15E+05 | 491 | 9.38E+04 | 451 | 1.25E+05 |
| 14 | 4.31E+05 | 2048 | 0.3205 | 468 | 2.00E+05 | 496 | 1.63E+05 | 456 | 2.17E+05 |

Table 3 lists the processing parameters estimated from the rheological data. The zero shear viscosity is proportional to the melt strength. $\eta_{100}$ influences the viscous energy dissipation and melt temperature, so that $\eta_{100}$ is proportional to melt temperature and extrusion pressure. The melt temperatures are estimated form the $\eta_{100}$ values. N_100 correlates with output rate. These data demonstrate that the peroxide treatment improves melt strength and output rate, while maintaining relatively lower melt temperature and extrusion pressure.

Example 3

Figure 1B:
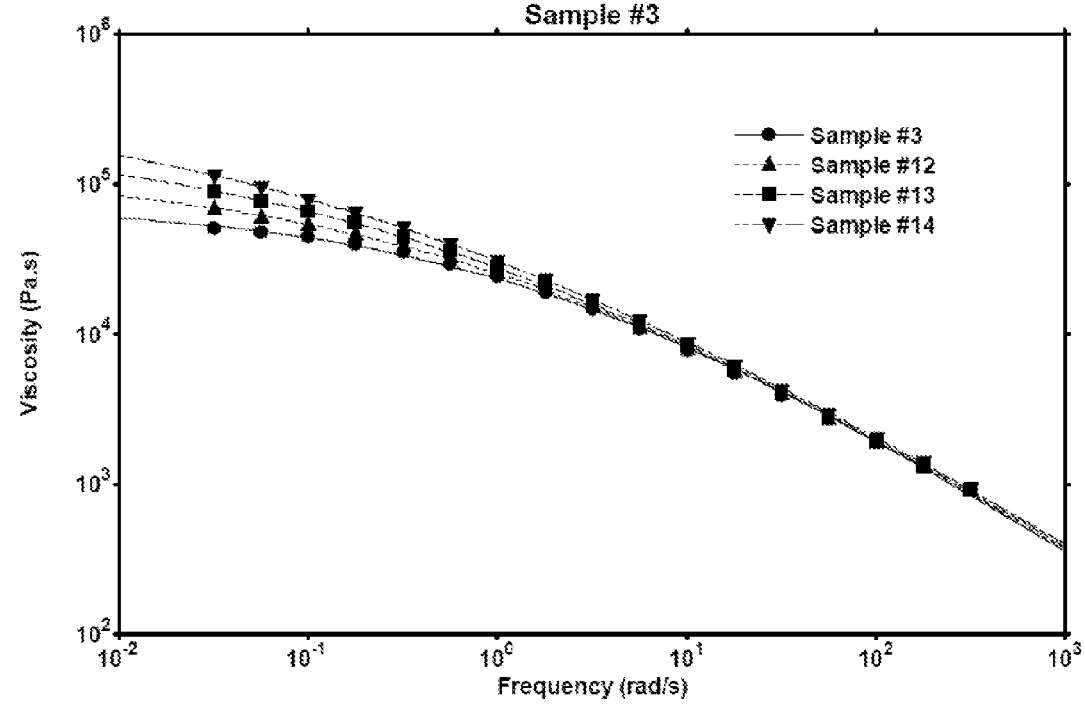
FIG. 1B displays viscosity curves for sample #3 from Example 1 with various amounts of peroxide modifier.

Polymer sample #2 and sample #3 were treated with various amounts of peroxide modifier (e.g., 2,5-dimethyl-2, 5-di(tert-butylperoxy)hexane), were subjected to rheology experiments and the data is displayed in FIG. 1A and FIG. 1B. FIG. 1A and FIG. 1B display the viscosity curves for peroxide treated resins (e.g., crosslinked metallocene-catalyzed PE copolymers) showing the increase of viscosities at low frequency range, and consequently improvement of the melt strength.

Example 4

Polymer sample #2 and sample #3 were treated with various amounts of peroxide modifier (e.g., 2,5-dimethyl-2, 5-di(tert-butylperoxy)hexane), were subjected to capillary rheometry experiments, and the data is displayed in Table 4. Sample #15 was prepared in a similar manner to sample #1.

TABLE 4

| | Smooth to Matte | | Slip-Stick transition | | |
|---|---|---|---|---|---|
| Sample ID# | Stress [kPa] | Shear rate [s$^{-1}$] | Stress [kPa] | Shear rate [s$^{-1}$] | Magnitude [psi] |
| 2 | 113 | 45 | 308 | 827 | 1111 |
| 9 | 90 | 25 | 314 | 823 | 1066 |
| 10 | 74 | 14 | 310 | 834 | 1019 |
| 11 | 67 | 10 | 307 | 821 | 978 |
| 3 | 122 | 59 | 318 | 808 | 1162 |
| 12 | 86 | 24 | 316 | 809 | 1055 |
| 13 | 87 | 24 | 316 | 800 | 1058 |
| 14 | 80 | 19 | 315 | 783 | 1023 |
| 15 | 108 | 17 | 259 | 258 | 759 |
| 7 | 74 | 19 | 237 | 584 | 522 |

Table 4 displays capillary melt fracture data. The peroxide treatment slightly reduces the magnitude of slip-stick pressure oscillation and the onset stress and shear rate of the matte transition. However, the peroxide treated samples still have good slip-stick melt fracture potential. The peroxide treatment increases the shear stress from smooth to matte transition over the commercial sample #7.

ADDITIONAL DISCLOSURE

The following are enumerated embodiments are provided as non-limiting examples.

A first embodiment, which is a crosslinked metallocene-catalyzed polyethylene copolymer having a higher molecular weight (HMW) component and lower molecular weight (LMW) component wherein the HMW component is present in an amount of from about 10 wt. % to about 30 wt. % and wherein the LMW component is present in an amount of from about 70 wt. % to about 90 wt. %.

A second embodiment, which is the copolymer of the first embodiment which when tested in accordance with ASTM D1505 has a density of from about 0.925 g/cc to about 0.945 g/cc.

A third embodiment, which is the copolymer of the first through the second embodiments, having a molecular weight distribution of from about 4 to about 18.

A fourth embodiment, which is the copolymer of the first through the third embodiments which when tested in accordance with ASTM D1238 under a force of 2.16 kg has a melt index of from about 0.2 g/10 min to about 0.8 g/10 min.

A fifth embodiment, which is the copolymer of the first through the fourth embodiments having a number average molecular weight of from about 15 kg/mol to about 40 kg/mol.

A sixth embodiment, which is the copolymer of the first through the fifth embodiments having a weight average molecular weight of from about 150 kg/mol to about 250 kg/mol.

A seventh embodiment, which is the copolymer of the first through the sixth embodiments having a z-average molecular weight of from about 600 kg/mol to about 800 kg/mol.

An eighth embodiment, which is the copolymer of the first through the seventh embodiments which when tested in accordance with ASTM D1238 under a force of 21.6 kg has a high load melt index of from about 6 g/10 min to about 25 g/10 min.

A ninth embodiment, which is the copolymer of the first through the eighth embodiments having a CY-a value of from about 0.2 to about 0.6.

A tenth embodiment, which is the copolymer of the first through the ninth embodiments which when tested in accordance with ASTM D638 and/or ISO 527 has a Young's modulus of from about 120 kpsi to about 190 kpsi.

An eleventh embodiment, which is the copolymer of the first through the tenth embodiments having a viscous relaxation time of from about 0.5 s to about 8 s.

A twelfth embodiment, which is the copolymer of the first through the eleventh embodiments having an $\eta_0$ (eta_0) of from about $5.0 \times 10^4$ Pa-s to about $8.0 \times 10^5$ Pa-s.

A thirteen embodiment, which is the copolymer of the first through the twelfth embodiments having an $\eta_{100}$ (eta_100) of from about 1,000 Pa-s to about 4,000 Pa-s.

A fourteenth embodiment, which is the copolymer of the first through the thirteenth embodiments which when tested in accordance with ASTM D638 and/or ISO 527 has a percent elongation at break of from about 450% to about 800%.

A fifteenth embodiment, which is the copolymer of the first through the fourteenth embodiments which when tested in accordance with ASTM D638 and/or ISO 527 has a percent elongation at yield of from about 8.0% to about 20%.

A sixteenth embodiment, which is the copolymer of the first through the fifteenth embodiments which when tested in accordance with ASTM D638 and/or ISO 527 has a tensile strength at break of from about 3,500 psi to about 6,000 psi.

A seventeenth embodiment, which is the copolymer of the first through the sixteenth embodiments which when tested in accordance with ASTM D638 and/or ISO 527 has a tensile strength at yield of from about 2,600 psi to about 3,000 psi.

An eighteenth embodiment, which is the copolymer of the first through the seventeenth embodiments which when tested in accordance with ASTM D3895 has an oxidative induction time of greater than about 100 min.

A nineteenth embodiment, which is the copolymer of the first through the eighteenth embodiments which when tested in accordance with ASTM D3895 has an oxidative induction temperature of greater than about 220° C.

A twentieth embodiment, which is the copolymer of the first through the nineteenth embodiments having gels present in an amount of less than about 300/sq. ft., wherein the gels have a size greater than about 200 microns.

A twenty-first embodiment, which is the copolymer of the first through the twentieth embodiments which when tested in accordance with ASTM F2231 has a Charpy impact energy of from about 0.9 J to about 3.0 J.

A twenty-second embodiment, which is the copolymer of the first through the twenty-first embodiments which when tested in accordance with ASTM F2231 has a Charpy temperature of from about −35° C. to about −10° C.

A twenty-third embodiment, which is the copolymer of the first through the twenty-second embodiments which when tested in accordance with ASTM D638 has a tensile natural draw ratio of from about 380% to about 500%.

A twenty-fourth embodiment, which is the copolymer of the first through the twenty-third embodiments which when tested in accordance with ASTM F1473 has a resistance to slow crack growth of greater than about 500 h, wherein the resistance to slow crack growth is defined as the PENT failure time.

A twenty-fifth embodiment, which is the copolymer of the first through the twenty-fourth embodiments which when tested in accordance with ISO 13477 has a S4 critical temperature of from about −30° C. to about −10° C. for a 2"DR11 pipe.

A twenty-sixth embodiment, which is the copolymer of the first through the twenty-fifth embodiments which when tested in accordance with ISO 13477 has a S4 critical pressure of about greater than about 12 bar as determined at 0° C. for a 2"DR11 pipe.

A twenty-seventh embodiment, which is a pipe formed from the copolymer of the first through the twenty-sixth embodiments.

While embodiments of the invention have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference, to the extent that they provide exemplary, procedural or other details supplementary to those set forth herein.

What is claimed is:

1. A polyethylene copolymer composition comprising a base resin and a peroxide modifier, wherein the base resin comprises a bimodal metallocene-catalyzed polyethylene copolymer having a higher molecular weight (HMW) component and lower molecular weight (LMW) component; wherein the HMW component is present in an amount of from 10 wt. % to 30 wt. %; wherein the LMW component is present in an amount of from 70 wt. % to 90 wt. %; wherein the bimodal metallocene-catalyzed polyethylene copolymer has a density of from 0.925 g/cc to 0.945 g/cc, when tested in accordance with ASTM D1505; wherein the bimodal metallocene-catalyzed polyethylene copolymer has gel present in an amount of less than 25/sq. ft., wherein the gels have a size greater than 200 microns; and wherein the peroxide modifier is present in the polyethylene copolymer in an amount of from 25 ppm to 400 ppm, based on the total weight of the base resin.

2. The polyethylene copolymer composition of claim 1, wherein the peroxide modifier comprises 2,5-dimethyl-2,5-di(tert-butylperoxy)hexane; 1,1-di(tert-butylperoxy)cyclohexane; 1,1-di(tert-amylperoxy)cyclohexane; 1,1-di-(tert-butylperoxy)-3,3,5-trimethylcyclohexane; tert-butylperoxy 2-ethylhexyl carbonate; di-2-ethylhexyl peroxydicarbonate; tert-amyl peroxypivalate; tert-butyl peroxypivalate; di-(3,5,5-trimethylhexanoyl) peroxide; dilauroylperoxide; didecanoyl peroxide; 1,1,3,3-tetramethylbutyl-peroxy-2-ethyl hexanoate; dibenzoyl peroxide; 2,5-dimethyl-2,5-di(2-ethylhexanoyl peroxy)hexane; tert-amyl peroxy-2-ethylhexanoate; tert-butyl peroxy-2-ethylhexanoate; tert-butyl peroxy isobutyrate; OO-t-amyl-O-(2-ethylhexyl monoperoxy-carbonate); OO-t-butyl O-isopropyl monoperoxy-carbonate; OO-t-butyl-O-(2-ethylhexyl) monoperoxy-carbonate; butyl 4,4-di(t-butylperoxy)valerate; ethyl 3,3-di-(t-butylperoxy)butyrate; or combinations thereof.

3. The polyethylene copolymer composition of claim 1, wherein the HMW component is present in the bimodal metallocene-catalyzed polyethylene copolymer in an amount of from 15 wt. % to 25 wt. %; and wherein the LMW component is present in the bimodal metallocene-catalyzed polyethylene copolymer in an amount of from 75 wt. % to 85 wt. %.

4. The polyethylene copolymer composition of claim 1, wherein the bimodal metallocene-catalyzed polyethylene copolymer has a high load melt index of from 6 g/10 min to 25 g/0 min when tested in accordance with ASTM D1238 under a force of 21.6 kg.

5. The polyethylene copolymer composition of claim 1, wherein the bimodal metallocene-catalyzed polyethylene copolymer has an oxidative induction temperature of greater than 220° C. when tested in accordance with ASTM D3895.

6. The polyethylene copolymer composition of claim 1, wherein the bimodal metallocene-catalyzed polyethylene copolymer has a tensile natural draw ratio of from 380% to 500% when tested in accordance with ASTM D638.

7. A crosslinked metallocene-catalyzed polyethylene copolymer having a higher molecular weight (HMW) component and lower molecular weight (LMW) component; wherein the HMW component is present in an amount of from 10 wt. % to 30 wt. %; wherein the LMW component is present in an amount of from 70 wt. % to 90 wt. %; wherein the copolymer has gels present in an amount of less than 300/sq. ft., wherein the gels have a size greater than 200 microns; wherein the copolymer has a density of from 0.925 g/cc to 0.945 g/cc, when tested in accordance with ASTM D1505; and wherein the copolymer has an η0 (eta_0) that is increased by equal to or greater than 25% when compared to an η0 (eta_0) of a base resin prior to treatment with a peroxide modifier, and wherein the base resin is treated with the peroxide modifier to produce the crosslinked metallocene-catalyzed polyethylene copolymer.

8. The copolymer of claim 7 having an η0 (eta_0) that is increased by from 50% to 350% when compared to an η0 (eta_0) of a base resin prior to treatment with a peroxide modifier, and wherein the base resin is treated with the peroxide modifier to produce the crosslinked metallocene-catalyzed polyethylene copolymer.

9. The copolymer of claim 7 having a melt temperature that is within 5° C. of a melt temperature of a base resin prior to treatment with a peroxide modifier, and wherein the base resin is treated with the peroxide modifier to produce the crosslinked metallocene-catalyzed polyethylene copolymer.

10. The copolymer of claim 7 which when tested in accordance with ASTM D1238 under a force of 21.6 kg has a high load melt index that is decreased by less than 10% when compared to a high load melt index of a base resin prior to treatment with a peroxide modifier, and wherein the base resin is treated with the peroxide modifier to produce the crosslinked metallocene-catalyzed polyethylene copolymer.

11. The copolymer of claim 7 which when tested in accordance with ASTM D1238 under a force of 21.6 kg has a high load melt index of from 6 g/10 min to 25 g/10 min; and which when tested in accordance with ASTM D1238 under a force of 2.16 kg has a melt index of from 0.2 g/10 min to 0.8 g/10 min.

12. The copolymer of claim 7 having a N_100 that is increased by at least 2% when compared to a N_100 of a base resin prior to treatment with a peroxide modifier, and wherein the base resin is treated with the peroxide modifier to produce the crosslinked metallocene-catalyzed polyethylene copolymer.

13. A pipe formed from the copolymer of claim 7.

14. The pipe of claim 13, wherein the copolymer of claim 7 comprises a pre-pigmented resin.

15. The pipe of claim 13, wherein the copolymer of claim 7 is contacted with a color pigment to form the pipe.

16. The pipe of claim 15, wherein the color pigment comprises carbon black, and wherein the carbon black is present in the pipe in an amount of less than 2.5 wt. %, based on the weight of the pipe.

17. The pipe of claim 15, wherein the pipe has a wall thickness of equal to or greater than 0.18 inches (4.6 mm).

18. The pipe of claim 13, wherein the pipe has a diameter of equal to or greater than 8 inches; wherein the pipe is an extruded pipe; wherein the pipe displays an increase in η0 (eta_0) when compared to an η0 (eta_0) of a pipe formed from a base resin prior to treatment with a peroxide modifier; and wherein the increase in η0 (eta_0) improves the slump resistance in the extruded pipe.

19. The pipe of claim 13, wherein the pipe has a diameter of equal to or greater than 8 inches; wherein the pipe is an extruded pipe; wherein the pipe displays an increase in η0 (eta_0) of equal to or greater than 50% when compared to an η0 (eta_0) of a pipe formed from a base resin prior to treatment with a peroxide modifier; and wherein the increase in η0 (eta_0) improves the slump resistance in the extruded pipe.

20. The pipe of claim 13, wherein the pipe has a diameter of equal to or greater than 8 inches; wherein the pipe is an extruded pipe; wherein the pipe displays an increase in η0 (eta_0) of equal to or greater than 150% when compared to an η0 (eta_0) of a pipe formed from a base resin prior to treatment with a peroxide modifier; and wherein the increase in η0 (eta_0) improves the slump resistance in the extruded pipe.

21. The pipe of claim 13, wherein the pipe has a diameter of equal to or greater than 8 inches; wherein the pipe is an extruded pipe; wherein the pipe displays an increase in η0 (eta_0) of from 60% to 450% when compared to an η0 (eta_0) of a pipe formed from a base resin prior to treatment with a peroxide modifier; and wherein the increase in η0 (eta_0) improves the slump resistance in the extruded pipe.

22. The pipe of claim 13, wherein the pipe has a diameter of equal to or greater than 8 inches, and wherein the pipe has an uniform pipe wall thickness.

\* \* \* \* \*